US012393151B2

(12) United States Patent

Nakaegawa et al.

(10) Patent No.: US 12,393,151 B2

(45) Date of Patent: Aug. 19, 2025

(54) IMAGE FORMING SYSTEM

(71) Applicant: CANON KABUSHIKI KAISHA, Tokyo (JP)

(72) Inventors: Tohru Nakaegawa, Chiba (JP); Yoshiro Tsukada, Chiba (JP); Kenichiro Kitajima, Ibaraki (JP); Naoyuki Yamamoto, Chiba (JP); Kota Mori, Chiba (JP); Shuichi Tamura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/522,633

(22) Filed: Nov. 29, 2023

(65) Prior Publication Data

US 2024/0192626 A1 Jun. 13, 2024

(30) Foreign Application Priority Data

Dec. 8, 2022 (JP) ................................. 2022-196470

(51) Int. Cl.
*B65H 45/12* (2006.01)
*G03G 15/00* (2006.01)

(52) U.S. Cl.
CPC ......... *G03G 15/6582* (2013.01); *B65H 45/12* (2013.01); *B65H 2301/45* (2013.01); *B65H 2701/1722* (2013.01)

(58) Field of Classification Search
CPC ........ B65H 2701/1722; B65H 2301/45; B65H 45/12; G03G 15/6582; G03G 2215/00472
See application file for complete search history.

(56) References Cited

U.S. PATENT DOCUMENTS

| | | | | |
|---|---|---|---|---|
| 11,772,408 | B2 | 10/2023 | Tsukada | |
| 2002/0051027 | A1* | 5/2002 | Kyogoku | B41J 2/325 347/19 |
| 2008/0018093 | A1* | 1/2008 | Shinchi | B41J 13/0036 283/67 |
| 2023/0062516 | A1* | 3/2023 | Hatanaka | B42D 15/04 |
| 2023/0068570 | A1 | 3/2023 | Tamura | |

FOREIGN PATENT DOCUMENTS

| | | | |
|---|---|---|---|
| JP | 2008-155412 | A | 7/2008 |
| JP | 2008-168535 | A | 7/2008 |
| JP | 2014-035454 | A | 2/2014 |

* cited by examiner

*Primary Examiner* — Jennifer Bahls

(74) *Attorney, Agent, or Firm* — Venable LLP

(57) ABSTRACT

An image forming system includes an image forming apparatus including a stacking portion, an image forming unit, and a fixing portion; a pressure-bonding processing apparatus including a folding processing portion, and a pressure-bonding portion; an inputting portion capable of inputting directions of a front surface and a back surface of the recording material stacked on the stacking portion; and a displaying portion for displaying a message indicating that a pressure-bonding printed matter is not properly prepared in a case that directions of the front surface and the back surface of the recording material inputted by the inputting portion are different from directions of the front surface and the back surface of the recording material in which the pressure-bonding printed matter is capable of being properly prepared.

23 Claims, 14 Drawing Sheets

(a)

(b)

| | FILDING PROCESSING APPARATUS | | | | IMAGE FORMING APPARATUS | |
|---|---|---|---|---|---|---|
| | FEEDING DIRECTION (FOLD POSITION) | | FOLDING DIRECTION | | DISCH DIRECTION | SET DIRECTION |
| E1 |  | FDLE |  | FD VF | FACE UP | PS : UP |
| E2 |  | FDTE | | | FACE DOWN | PS : DOWN |
| E3 |  | FDLE |  | FD MF | FACE UP | PS : DOWN |
| E4 |  | FDTE | | | FACE DOWN | PS : UP |

(a)

(b)

IMAGE FORMING SYSTEM

FIELD OF THE INVENTION AND RELATED ART

The present invention relates to an image forming system for preparing (creating) a pressure-bonding printed matter by forming an image on a recording material, folding (bending) the recording material on which the image is formed, and pressure-bonding the recording material under application of heat and pressure to the folded recording material.

Conventionally, the image forming system for preparing the pressure-bonding printed matter excellent in confidentiality of information has been proposed (Japanese Laid-Open Patent Application (JP-A) 2014-35454). As the pressure-bonding printed matter, it is possible to cite, for example, a pressure-bonding postcard such that (opposing) surfaces thereof are superposed and pseudo-bonded together and that personal information cannot be read until the surfaces pseudo-bonded together are peeled off from each other. Here, pseudo-bonding refers to one form of bonding such that the surfaces are peelable after the bonding and are not readily bonded again after the peeling. As a type in which the pseudo-bonding is made, there is a paste type in which the pseudo-bonding is made by using a recording material of a pre-paste type in which a pressure-bonding paste is applied in advance.

The pressure-bonding printed matter is prepared in a manner such that a toner image is formed on the recording material on the basis of image data by an image forming apparatus and that the recording material on which the toner image is formed is then folded and is further heated and pressed by the pressure-bonding processing apparatus. In the image forming apparatus, an image relating to information desired to be kept a secret (hereinafter, this image is referred to as a secret information image) is required to be formed on a paste surface onto which the pressure-bonding paste was applied. In order to obtain a pressure-bonding printed matter prepared by forming the secret information image on the paste surface (also referred to as a pressure-bonding surface (side)), a user is required to set the recording material in a cassette or a tray of the image forming apparatus in a set mode determined depending on a specification of the image forming apparatus and a specification of the pressure-bonding processing apparatus.

Therefore, conventionally, in the case where the user sets the recording material in an erroneous set mode, a pressure-bonding postcard such that a non-secret information image is formed on a paste surface and that a secret information image is formed on a non-paste surface was transferred. In order to avoid this preparation, the user checks whether or not the recording material is set in the erroneous set mode by expressly performing test printing, and thus the preparation of the pressure-bonding postcard taken time and became troublesome.

SUMMARY OF THE INVENTION

According to an aspect of the present invention, there is provided an image forming system comprising: an image forming apparatus including a stacking portion capable of stacking a recording material having an adhesive region in which an adhesive is applied onto a surface of the recording material, an image forming unit for forming an image on the recording material, and a fixing portion for fixing the image formed on the recording material; a pressure-bonding processing apparatus including a folding processing portion for folding the recording material fed from the image forming apparatus, and a pressure-bonding portion capable of pressure-bonding the recording material folded by the folding processing portion under pressure application; an inputting portion capable of inputting directions of a front surface and a back surface of the recording material stacked on the stacking portion; and a displaying portion for displaying a message indicating that a pressure-bonding printed matter is not properly prepared in a case that the direction of the front surface and the back surface of the recording material inputted by the inputting portion are different from directions of the front surface and the back surface of the recording material in which the pressure-bonding printed matter is capable of being properly prepared.

Further features of the present invention will become apparent from the following description of exemplary embodiments with reference to the attached drawings.

Figure 3:
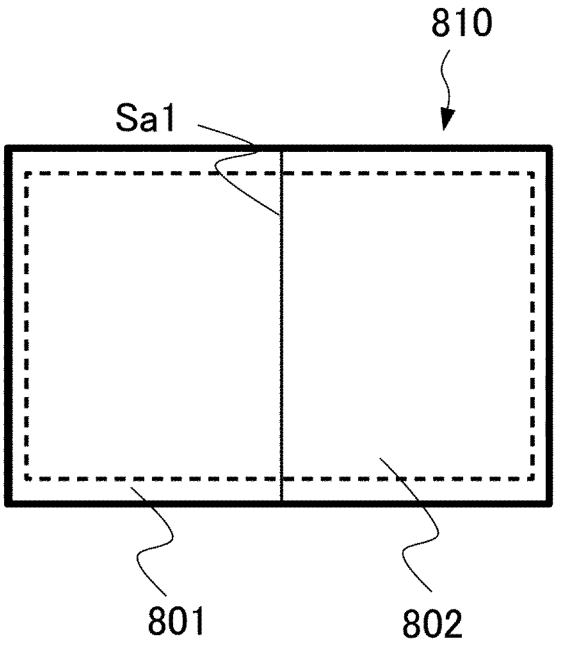
Figure 3:
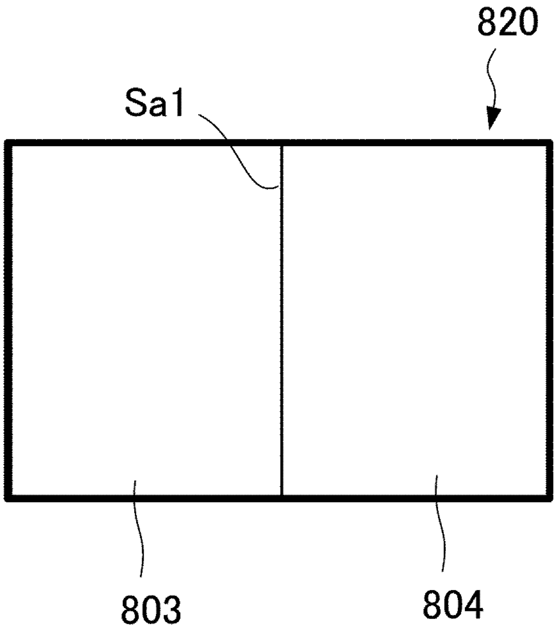

Parts (a) and (b) of FIG. 3 are schematic views showing a pressure-bonding postcard sheet for two-folding, in which part (a) shows a first surface side, and part (b) shows a second surface side.

Figure 4:
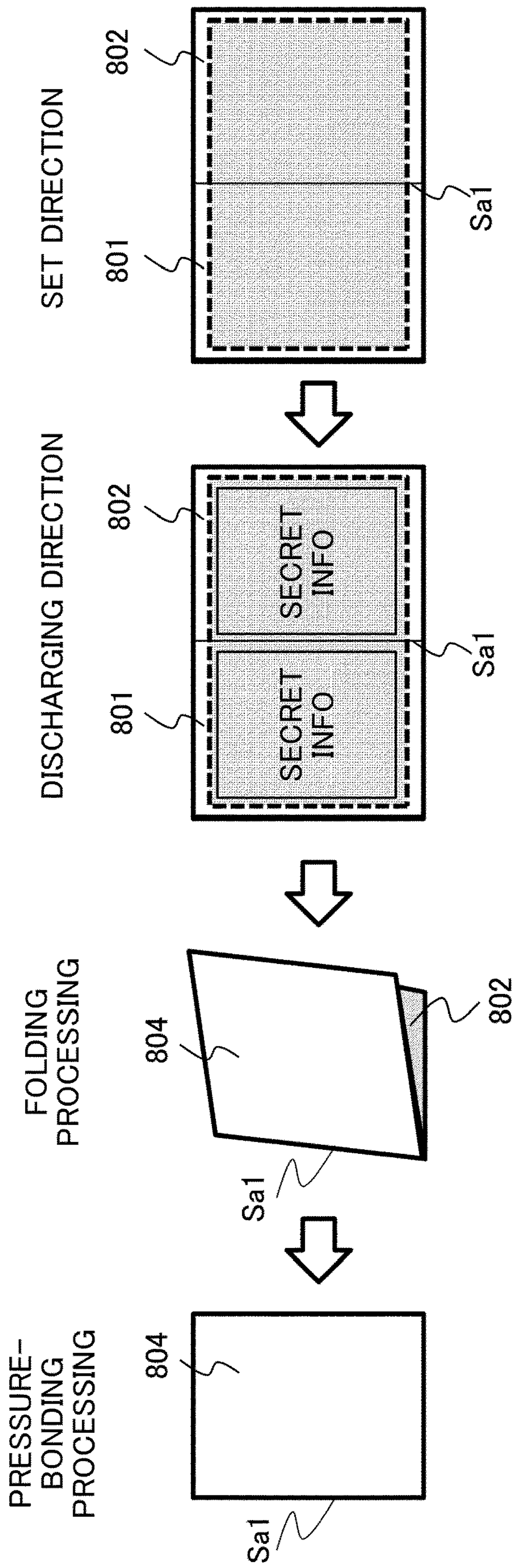

FIG. 4 is a schematic view showing an example of directions of the pressure-bonding postcard sheet during the two-folding.

Figure 5:
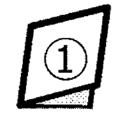
Figure 5:
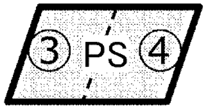
Figure 5:
Figure 5:
Figure 5:
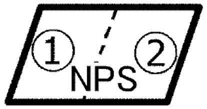
Figure 5:
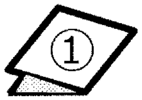
Figure 5:
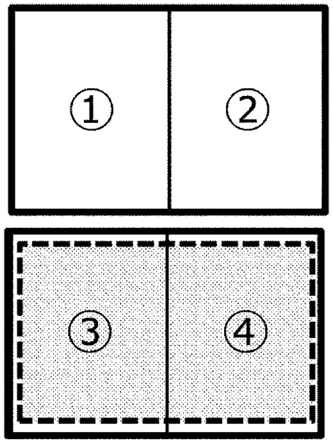

FIG. 5 is a schematic view of set modes of the pressure-bonding postcard sheet for the two-folding.

Figure 6:
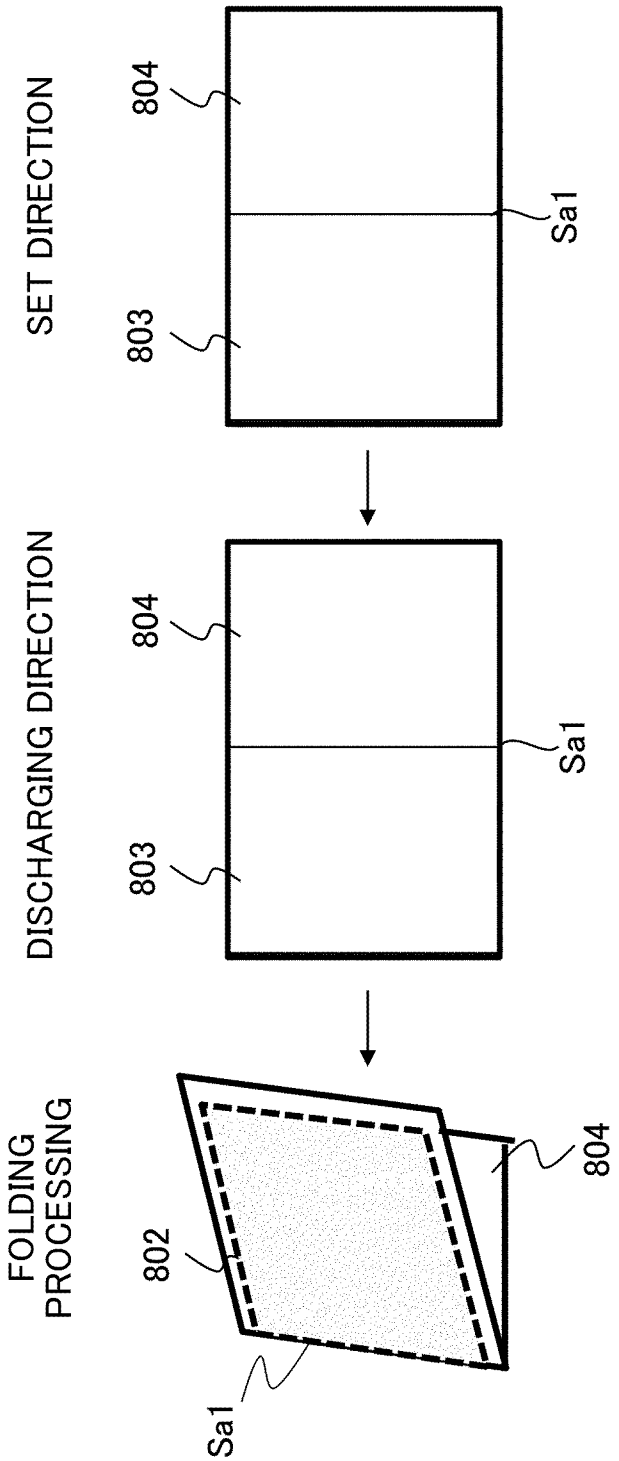

FIG. 6 is a schematic view showing a preparation (creation) example of a pressure-bonding postcard in the case where the set mode of the pressure-bonding postcard sheet for the two-folding is incorrect.

Figure 7:
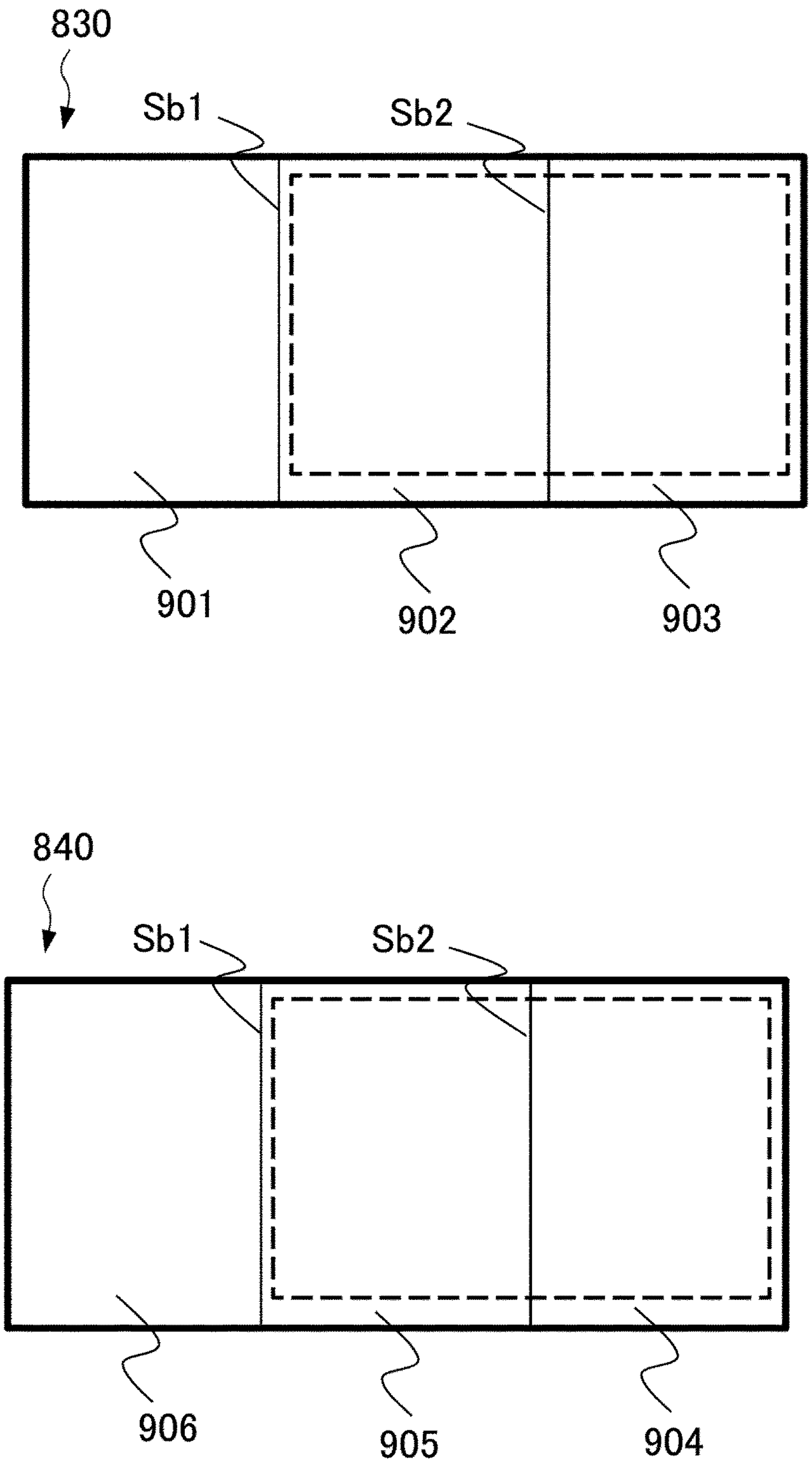

Parts (a) and (b) of FIG. 7 are schematic views showing a pressure-bonding postcard sheet for two-folding, in which part (a) shows a first surface side, and part (b) shows a second surface side.

Figure 8:
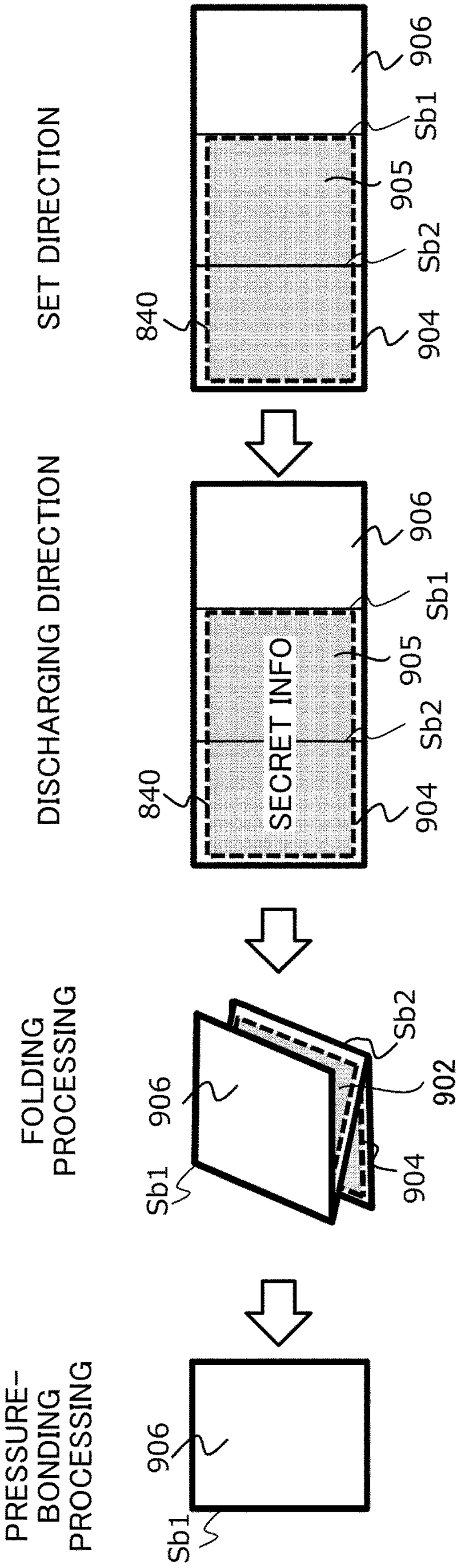

FIG. 8 is a schematic view showing an example of directions of the pressure-bonding postcard sheet during the outward three-folding.

Figure 9:
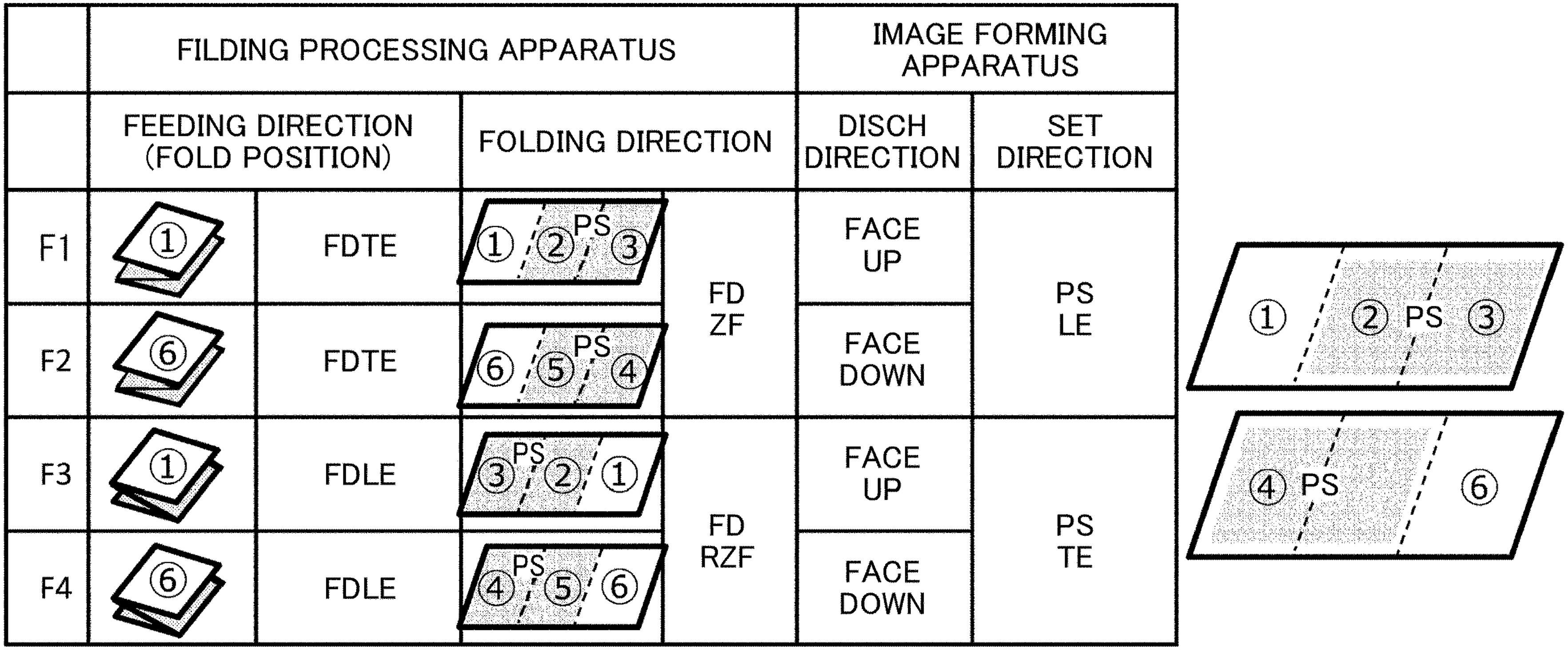

FIG. 9 is a schematic view of set modes of the pressure-bonding postcard sheet for the outward three-folding.

Figure 10:
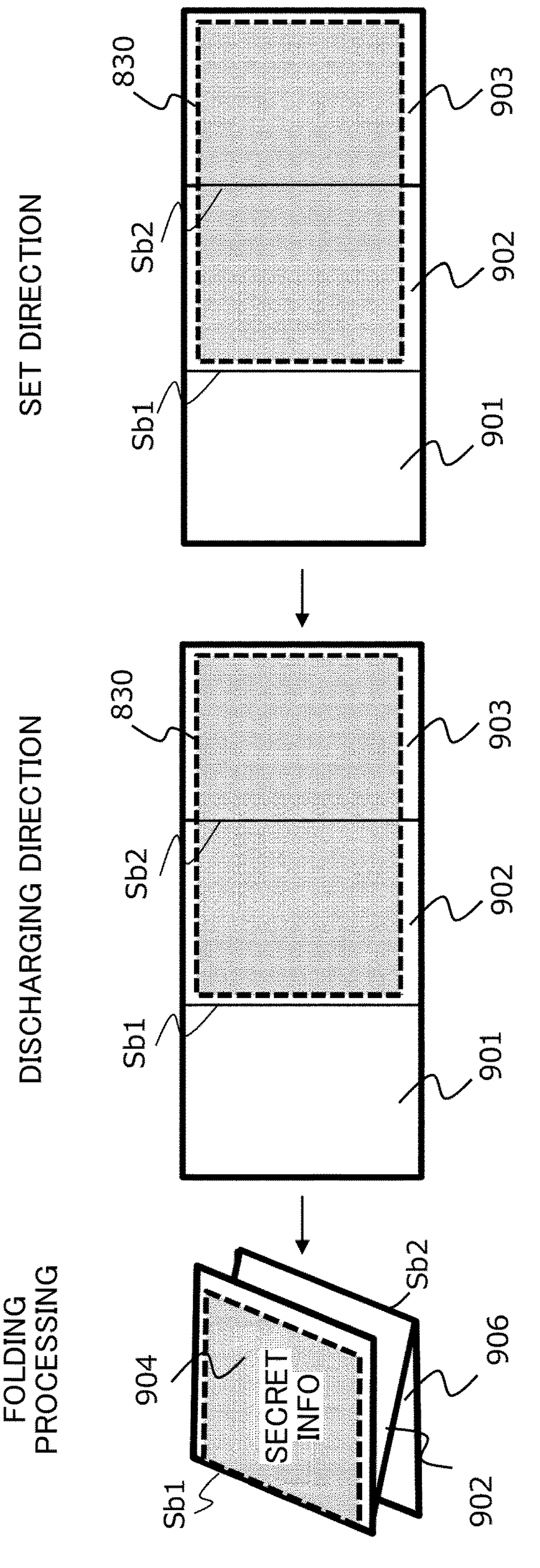

FIG. 10 is a schematic view showing a preparation example of a pressure-bonding postcard in the case where the set mode of the pressure-bonding postcard sheet for the outward three-folding is incorrect.

Figure 11:
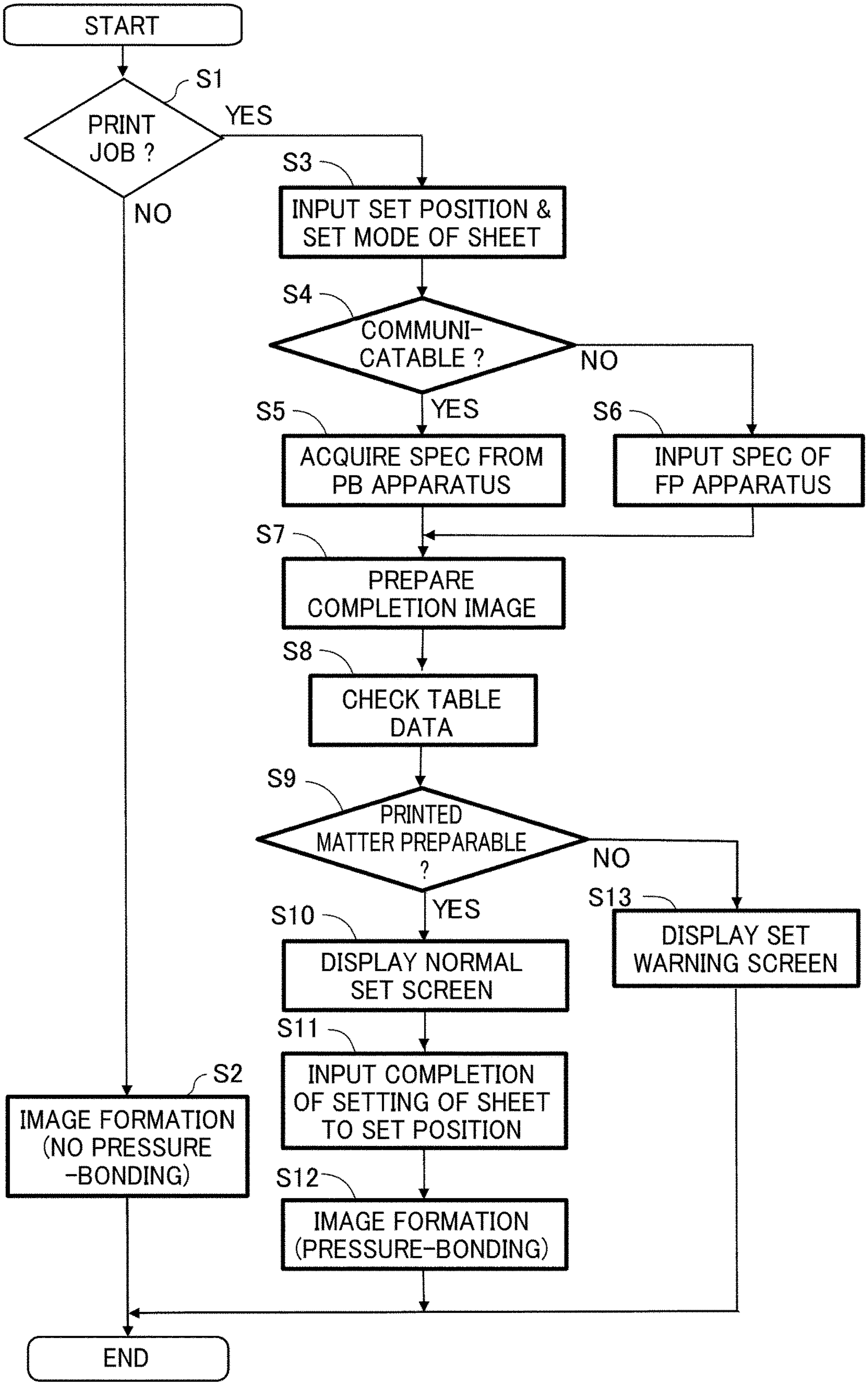

FIG. 11 is a flowchart showing a pressure-bonding printed matter preparation processing.

Figure 12:
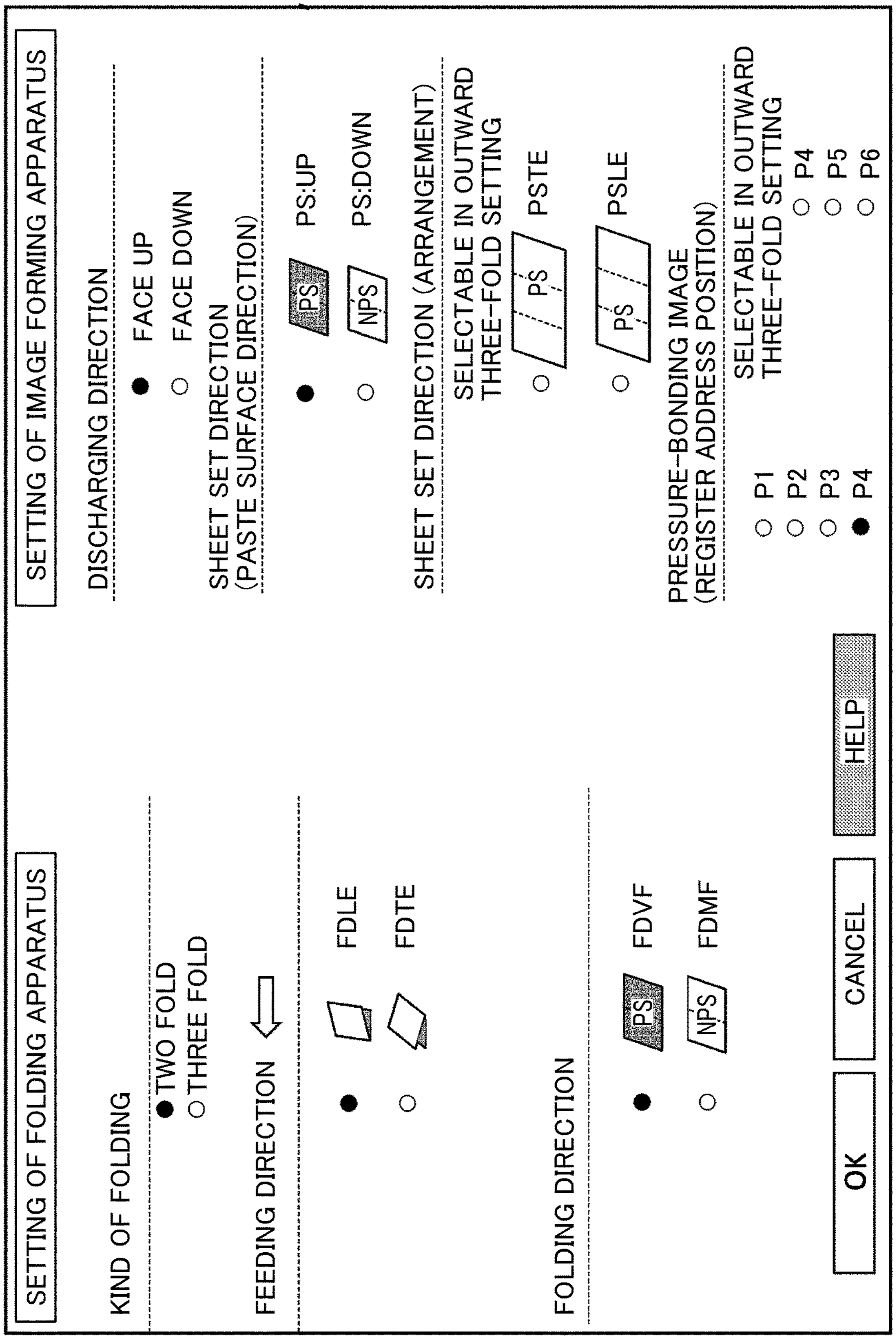

FIG. 12 is a schematic view showing an example of a setting screen.

Figure 13:
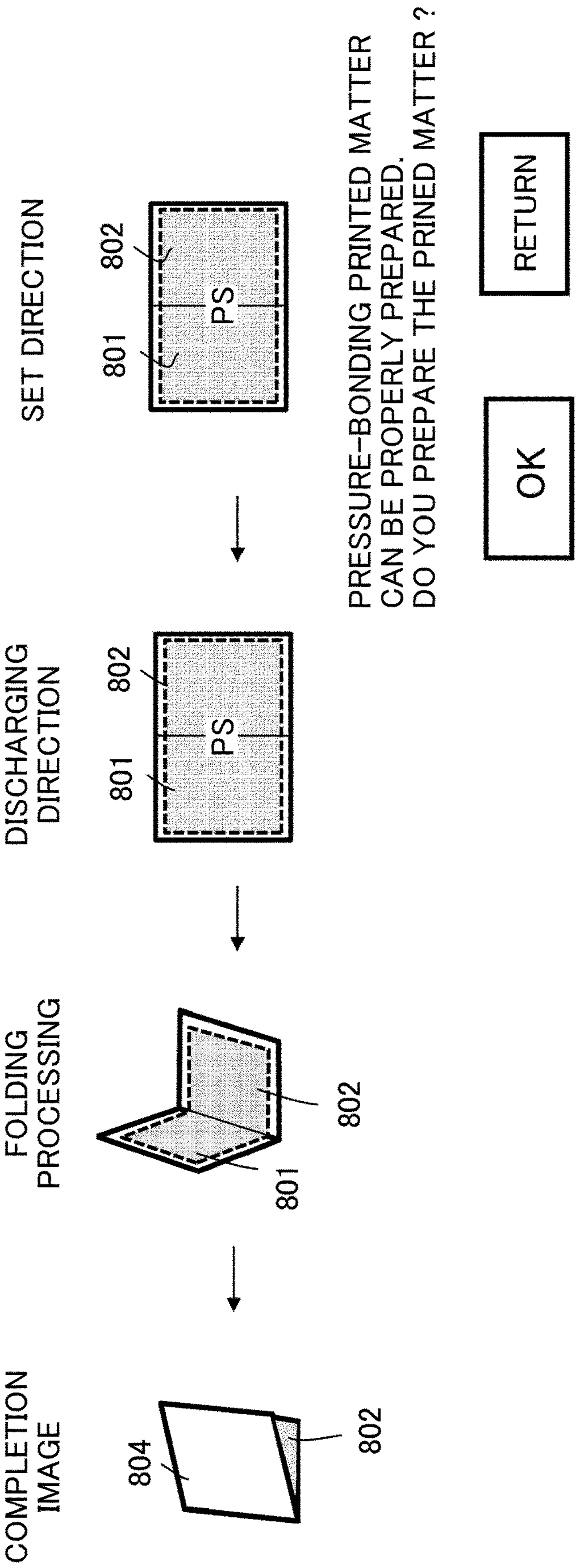

FIG. 13 is a schematic view showing an example of a normal set screen.

Figure 14:
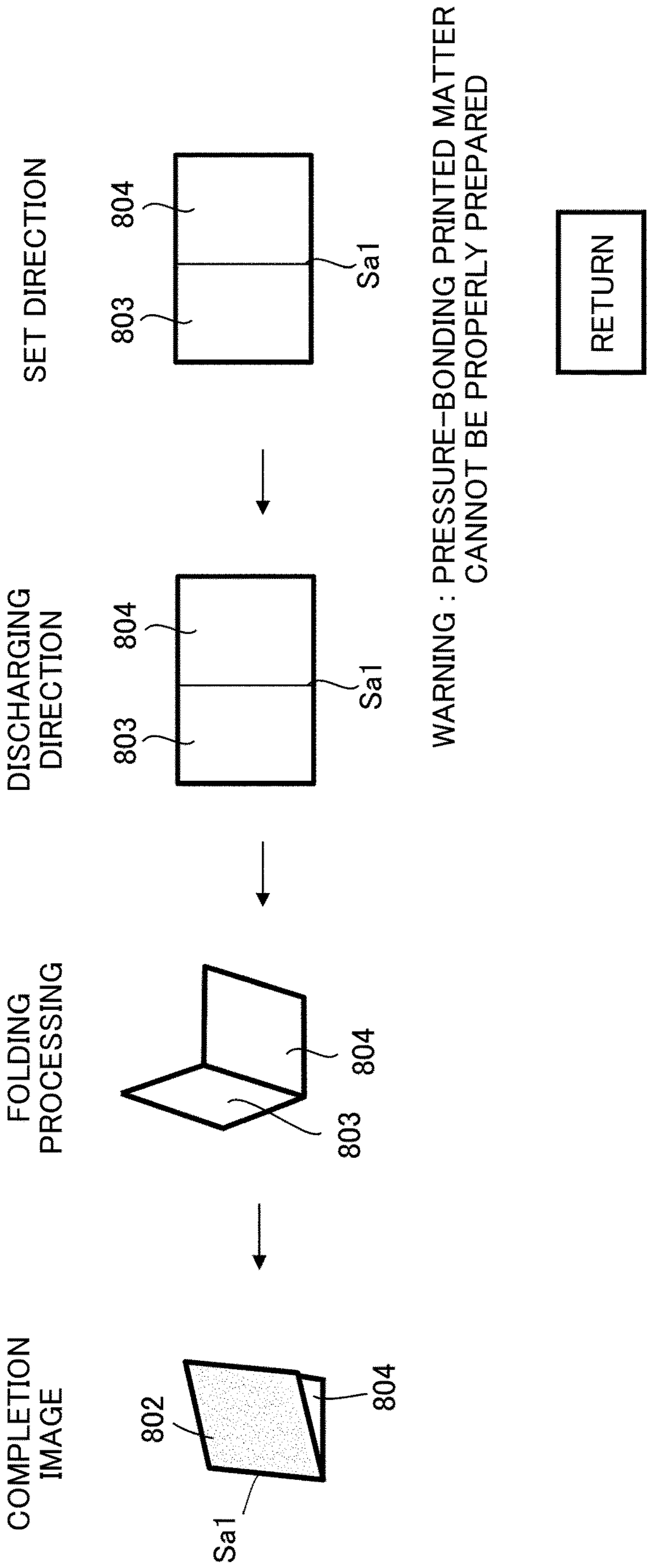

FIG. 14 is a schematic view showing an example of a set warning screen.

DESCRIPTION OF THE EMBODIMENTS

<Image Forming System>

In the following, an embodiment will be described. First, an image forming system 1X of this embodiment will be described using FIG. 1. The image forming system 1X of this embodiment includes an image forming apparatus 100 for forming a toner image on a recording material S and a pressure-bonding processing apparatus 200 for subjecting the recording material S, on which the toner image is formed by the image forming apparatus 100, to pressure-bonding processing. The pressure-bonding processing apparatus 200 is a post-step unit retrofittable to the image forming apparatus 100 for function expansion, and the image forming apparatus 100 and the pressure-bonding processing apparatus 200 are provided detachably mountable to each other and are connected to each other so as to be capable of delivering the recording material S therebetween. This image forming system 1X is capable of preparing (creating) a pressure-bonding printed matter such as a pressure-bonding postcard by feeding the recording material S, on which the image is formed by the image forming apparatus 100, to the pressure-bonding processing apparatus 200 and then by folding and pressure-bonding the recording material S by the pressure-bonding processing apparatus 200.

Figure 1:
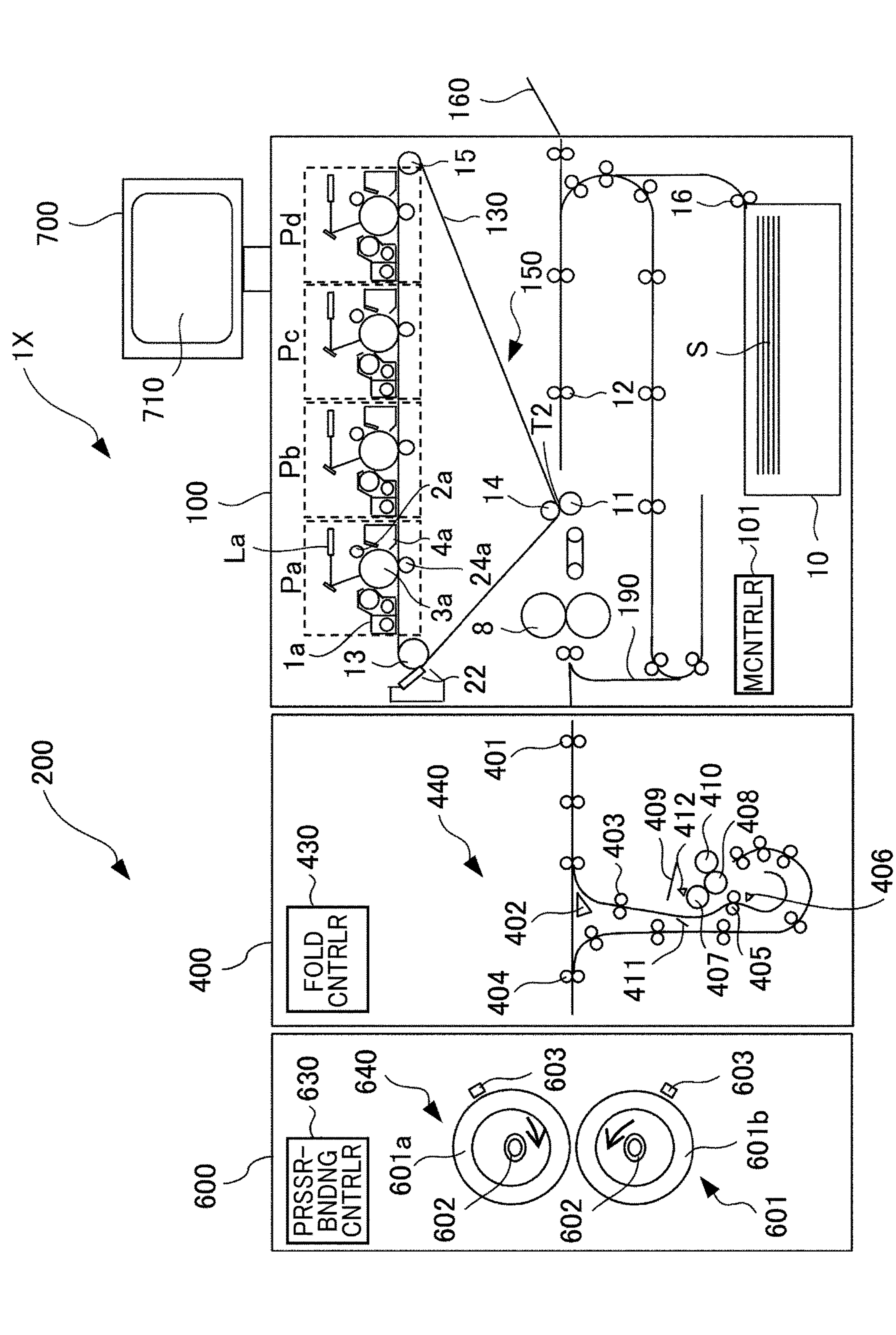
FIG. 1 is a schematic view showing an image forming system.

In FIG. 1, as the pressure-bonding processing apparatus 200, an apparatus including a folding processing apparatus 400, and a pressure-bonding apparatus 600 was shown as an example. The image forming apparatus 100, the folding processing apparatus 400, and the pressure-bonding apparatus 600 are connected to each other by data input/output interfaces (not shown) capable of serial communication or parallel communication so as to be capable of transmitting and receiving control signals and data therebetween.

<Image Forming Apparatus>

The image forming apparatus 100 will be described. The image forming apparatus 100 is an electrophotographic full-color printer of a tandem type. As shown in FIG. 1, the image forming apparatus 100 includes image forming portions Pa, Pb, Pc, and Pd for forming images of yellow, magenta, cyan, and black, respectively. The image forming apparatus 100 forms a toner image on the recording material S on the basis of image data sent from an original reading device (not shown) connected to an apparatus main assembly or from an external device (not shown) such as a personal computer or the like connected to the apparatus main assembly so as to be capable of inputting and outputting data.

The image data may include, for example, information on a plurality of toner images formed on a first surface side and a second surface side opposite from the first surface side of the recording material S, and in addition, in formation on a manner of folding (for example, a folding position of the outward three-folding depending on a size of the recording material S) or on pressure-bonding surfaces (surfaces on a valley folding side), and the like information. The information on the toner images includes an image formation order for forming the toner images. Further, the image data may include information on a paste surface (also, referred to as a pressure-bonding surface) where a pressure-bonding paste is applied onto the recording material S.

As shown in FIG. 1, the image forming portions Pa, Pb, Pc, and Pd are juxtaposed along a movement direction of the intermediary transfer belt 130 in the apparatus main assembly of the image forming apparatus 100. The intermediary transfer belt 130 is stretched by a plurality of rollers (13, 14, 15) and is rotated. Then, the intermediary transfer belt 130 carries and feeds a toner image primary-transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording material S is formed. On a side downstream of the secondary transfer portion T2 with respect to a recording material feeding direction, a fixing device 8 is provided.

The image forming apparatus 100 includes a cassette 10 in which recording materials S are set. The recording material S is supplied from the cassette 10 toward a registration roller pair 12 by a feeding roller 16. Thereafter, the registration roller pair 12 is started to be rotated in synchronism with the toner image formed on the intermediary transfer belt 130, so that the recording material S is fed toward the secondary transfer portion T2. A plurality of cassettes 10 capable of setting the recording materials S different in size and thickness may be provided, and in that case, the recording material S selected by a user is fed from either one of the plurality of cassettes 10. Further, in the case of this embodiment, the recording material S set on a manual feeding tray 160 is supplied. Incidentally, a constitution in which as an option, an unshown recording material supplying apparatus is connected to the image forming apparatus 100 and in which the recording material set in the recording material supplying apparatus is supplied to the image forming apparatus 100 may be employed.

In the case of this embodiment, the recording material S set in the cassette 10 as a second set portion is turned upside down and then is fed toward the registration roller pair 12. On the other hand, the recording material S set on the manual feeding tray 160 as a first set portion is fed toward the registration roller pair 12 without being turned upside down. Incidentally, there is also a specification, as a specification of the image forming apparatus 100, such that the recording material S set in the cassette 10 is fed toward the registration roller pair 12 without being turned upside down and that the recording material S set on the manual feeding tray 160 is turned upside down and then is fed toward the registration roller pair 12. For example, there is a case of an image forming apparatus of a vertical feeding type, not the image forming apparatus of a horizontal feeding type as in this embodiment.

The four image forming portions Pa, Pb, Pd, and Pd included in the image forming apparatus 100 have a substantially same constitution except that development colors are different from each other. Accordingly, in this embodiment, as a representative, the image forming portion Pa for yellow will be described, and other image forming portions Pb, Pc, and Pd will be omitted from description.

In the image forming portion Pa, a cylindrical photosensitive drum 3*a* is provided as a photosensitive member. The photosensitive drum 3*a* is rotationally driven in a predetermined direction. At a periphery of the photosensitive drum 3*a*, a charging device 2*a*, an exposure device La, a developing device 1*a*, a primary transfer roller 24*a*, and a drum cleaning device 4*a* are provided.

A process for forming, for example, a full-color image by the image forming apparatus 100 will be described. First, when an image forming operation is started, a surface of the rotating photosensitive drum 3*a* is electrically charged uniformly by the charging device 2*a*. The charging device 2*a* is a corona charger or the like for charging the photosensitive drum 3*a* to a uniform negative dark-portion potential by irradiating the photosensitive drum 3*a* with charge particles with corona discharge, for example. Then, the photosensitive drum 3*a* is subjected to scanning exposure to laser light which is emitted from the exposure device La and which corresponds to an image signal. By this, an electrostatic latent image depending on the image signal is formed on the surface of the photosensitive drum 3*a*. The electrostatic latent image formed on the photosensitive drum 3*a* is developed into a toner image which is a visible image by a developer, containing toner and a carrier accommodated in the developing device 1*a*.

In the case of this embodiment, in the developing device 1*a*, as the developer, a two-component developer containing non-magnetic toner and a magnetic carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon wax such as low-molecular weight polyethylene, low-molecular weight olefin copolymer wax, microcrystallin wax, Fischer-Tropsch wax, and paraffin wax; oxide of aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The toner image formed on the photosensitive drum 3*a* is transferred onto the intermediary transfer belt 130 at a primary transfer portion formed between the intermediary transfer belt 130 and the photosensitive drum 3*a* opposing the primary transfer roller 24*a*. At this time, to the primary transfer roller 24*a*, a primary transfer bias (voltage) is applied. After the transfer on the intermediary transfer belt 130, toner remaining on the surface of the photosensitive drum 3*a* is removed by the drum cleaning device 4*a*.

Such an operation is sequentially performed in the image forming portions Pa, Pb, Pc, and Pd for yellow, magenta, cyan and black, respectively, so that four color toner images are superposed on the intermediary transfer belt 130. Thereafter, in synchronism with toner image forming timing, the recording material S set in the cassette 10 is fed to the secondary transfer portion T2. Then, by applying a secondary transfer bias (voltage) to the outer secondary transfer roller 11, the toner images for a full-color image are collectively secondary-transferred onto the recording material S. Toner remaining on the intermediary transfer belt 130 after the transfer on the recording material S is removed by a belt cleaning device 22. Incidentally, in the case of this embodiment, an image forming unit portion 150 capable of forming the toner images on the recording material S is constituted by the image forming portions Pa to Pd, the intermediary transfer belt 130, the rollers (13, 14, 15), the outer secondary transfer roller 11, and the like.

The recording material S on which the toner images are formed is fed toward the fixing device 8 as a fixing portion. The fixing device 8 includes a fixing roller and a pressing roller, and at a fixing nip formed by the fixing roller and the pressing roller, the fixing device 8 nips and feeds the recording material S on which the toner image is formed and thus heats and presses the recording material S, so that the toner image is fixed on the recording material S.

The image forming apparatus 100 of this embodiment is capable of performing an operation in a one-side image forming mode in which an image is formed on a first (surface) side of the recording material S, and an operation in a double-side image forming mode in which images are formed on the first side and a second (surface) side opposite from the first side. During the operation in the one-side image forming mode, the recording material S on which the toner image is fixed on the one side by the fixing device 8 is discharged to the pressure-bonding processing apparatus 200. On the other hand, during the operation in the double-side image forming mode, the recording material S on which the toner image is fixed on the one side by the fixing device 8 is fed toward a double-side feeding portion 190. In the double-side feeding portion 190, the recording material S is reversed while being fed, so that the first side and the second side of the recording material S are replaced with each other. Then, the reversed recording material S is fed again toward the registration roller pair 12 through the double-side feeding portion 190. Then, the recording material S is fed by the registration roller pair 12 toward the secondary transfer portion T2 in a state in which the second side thereof where printing has not been carried out faces the intermediary transfer belt 130 side. At the secondary transfer portion T2, the toner images for a full-color image formed on the intermediary transfer belt 130 are collectively secondary-transferred on the second side of the recording material S. Thereafter, the recording material S is subjected to toner image fixing by the fixing device 8 and the recording material S on both surfaces of which the toner images are formed is discharged to the pressure-bonding processing apparatus 200.

Further, the image forming apparatus 100 includes a main controller 101. The main controller 101 as a controller can execute an image forming step for forming the image on the recording material S by controlling the image forming apparatus 100 and can execute a pressure-bonding processing step for folding and pressure-bonding the recording material S by controlling the pressure-bonding processing apparatus 200. A control constitution of the image forming system X will be described later (see FIG. 2).

<Pressure-Bonding Processing Apparatus>

Next, the pressure-bonding processing apparatus 200 will be described. As shown in FIG. 1, the pressure-bonding processing apparatus 200 includes the folding processing apparatus 400, and the pressure-bonding apparatus 600. The folding processing apparatus 400 folds the recording material S, and the pressure-bonding apparatus 600 pressure-bonds the folded recording material S under application of heat and pressure.

<Folding Processing Apparatus>

The folding processing apparatus 400 is an apparatus for performing folding (processing) for folding the recording material S subjected to the image forming step by the image forming apparatus 100. In this embodiment, the folding processing apparatus 400 of a roller press-contact type capable of folding two-folding processing in which a pressure-bonding printed matters for two-folding as the recording material of a pre-paste type is folded once in a V-shape and outward three-folding processing in which a pressure-bonding postcard sheet for outward three-folding is folded twice in a Z-shape was described. The folding processing apparatus 400 includes a folding processing controller 430 and a folding processing portion 440 for folding the recording material S. The folding processing controller 430 principally carries out the folding processing portion 440.

As regards an operation of the folding processing portion 440, the two-fold processing will be described as an example. The recording material S fed from the image forming apparatus 100 is drawn into the folding processing apparatus 400 by an entrance roller pair 401 and is sorted into separate feeding passages by a branch flapper 402 depending on whether or not the folding processing is required to be performed. That is, in the case where the folding processing is performed, the recording material S is sorted into a folding processing passage toward a feeding roller pair 403, and in the case where the folding processing is not performed, the recording material S is sorted into a folding-avoiding passage toward a discharging roller pair 404. In the case where the recording material S is sorted into the folding-avoiding passage, the recording material S is discharged to the pressure-bonding apparatus 600 by the discharging roller pair 404 without being subjected to the two-folding processing.

In the case where the recording material S is sorted into the folding processing passage, the recording material S is subjected to registration correction such that the recording material S is once stopped at a position of a registration roller pair 405 and a loop is formed. The recording material S subjected to the registration correction is fed again, and is drawn by a first folding roller 407 and a second folding roller 408 and passes through a folding position detecting sensor 406, and thereafter, when a trailing end of the recording material S abuts against a trailing end abutment stopper 411, the recording material S is subjected to the folding processing. The recording material S is folded in two in a fold so that the one (surface) side portions oppose each other. At this time, the drawn recording material S is guided by a leading end guide 412 moved to a predetermined position in advance, and thus is drawn by the second folding roller 408 and a third folding roller 410. The recording material S drawn by the second folding roller 408 and the third folding roller 410 is conveyed toward the discharging roller pair 404 and is discharged to the pressure-bonding apparatus 600 by the discharging roller pair 404.

Next, the operation of the folding processing portion 440 will be described by taking the outward three-folding processing as an example. Description which is the same as the description in the case of the two-folding processing will be simplified or omitted. As shown in FIG. 1, in the case where the recording material S is sorted into the folding processing passage, the recording material S is once stopped at the position of the registration roller pair 405 and the loop is formed, so that the registration correction is made. The recording material S subjected to the registration correction is fed again, and at a predetermined timing after the recording material S passes through the folding position detecting sensor 406, the recording material S is subjected to first folding processing simultaneously with drawing thereof by the first folding roller 407 and the second folding roller 408. Then, when the drawn recording material S abuts against a folding abutment stopper 409, the recording material S is subjected to second folding processing simultaneously with drawing thereof by the second folding roller 408 and the third folding roller 410. Thus, the recording material S is folded on the first side so that the one surface portions oppose each other and is folded on the second side opposite from the first side so that the other surface portions oppose each other. Then, the recording material S subjected to the second folding processing is fed toward the discharging roller pair 404 and is delivered to the subsequent pressure-bonding apparatus 600 *b* the discharging roller pair 404. Incidentally, in the case where the recording material S is sorted into the folding avoiding passage, the recording material S is not subjected to the above-described outward three-folding processing, and is delivered to the subsequent pressure-bonding apparatus 600 by the discharging roller pair 404.

<Pressure-Bonding Apparatus>

The pressure-bonding apparatus 600 is an apparatus for subjecting, to pressure-bonding for pressure-bonding the recording material S, the recording material S subjected to a folding processing step by the above-described folding processing apparatus 400. As an example, the pressure-bonding apparatus 600 of a roller press-contact type capable of pressure-bonding processing of the recording material S by applying heat and pressure to the recording material S through the pressure-bonding roller pair nipping and conveying the recording material S is described. The pressure-bonding apparatus 600 includes a pressure-bonding processing controller 630, and a pressure-bonding portion 640 capable of pressure-bonding the recording material S. The pressure-bonding processing controller 630 principally carries out control of the pressure-bonding portion 640.

The pressure-bonding portion 640 will be described. The pressure-bonding portion 640 includes a pressure-bonding roller pair 601 for nipping and feeding the recording material S by rotation, heaters 602 for heating the pressure-bonding roller pair 601, and thermistors 603 for detecting a temperature of the pressure-bonding roller pair 601. The pressure-bonding roller pair 601 includes an upper roller 601*a* and a lower roller 601*b* which are maintained at desired temperatures by the heaters 602 depending on detection temperatures of the thermistors 603. Further, the pressure-bonding roller pair 601 applies heat and pressure to the recording material S while nipping and feeding the recording material S in a folded state. By this, the recording material S folded so that the paste surface is positioned inside is subjected to pseudo-bonding so as to bond the paste surface together by pressure-bonding paste.

In the pressure-bonding apparatus 600, from the viewpoints of adhesive strength and a re-peeling property of the pressure-bonding printed matter, there is a need to control the temperature and the pressure of the recording material S during the pressure-bonding processing. This is because there is a liability that in the case where the temperature and the pressure are low, the adhesive force of the pressure-bonding paste becomes weak and thus a pseudo-bonding state cannot be maintained when the adhesive force is excessively low. On the other hand, this is because in the case where the temperature and the pressure are high, the adhesive force becomes strong, so that there is a liability that the re-peeling property lowers such that the recording material S is broken during the re-peeling when the adhesive force is excessively high. Therefore, there is a need to appropriately set the temperature and the pressure of the heat applied to the recording material S during the pressure-bonding processing, depending on a kind of the recording material S. For example, the temperature of the pressure-bonding roller pair 601 of the pressure-bonding apparatus 600 is set at "15° C. to 80° C.", preferably "20° C. to 60° C.", and the pressure thereof is set at several MPa or more, so that an appropriate adhesive force of the pressure-bonding paste can be obtained.

Incidentally, although the pressure of the pressure-bonding roller pair 601 is the "several MPa or more", a pressure applied to the recording material S by the fixing device 8 is about "0.1-0.5 MPa". As described above, the pressure-bonding paste, exhibits an adhesive property by exposure of the adhesive base material to the surface under application of a high pressure (several MPa or more), and therefore, in the fixing device 8 low in pressure, the recording material S is in a high-temperature state of "100° ° C. to 200° C.", but the adhesive base material is not readily exposed to the surface. Accordingly, the adhesive property does not exhibit. Accordingly, the recording material S passed through the fixing device 8 is subjected to the folding processing without being adhered to the folding processing apparatus 400.

<Control Constitution of Image Forming System>

Next, control of the image forming system 1X will be described using FIG. 2 while making reference to FIG. 1. In this embodiment, the case where the image forming apparatus 100 (specifically, the main controller 101) unitarily manages an operation instruction to the pressure-bonding processing apparatus 200 (the folding processing apparatus 400 and the pressure-bonding apparatus 600) and controls these apparatuses will be described as an example. Incidentally, in addition to the devices illustrated in FIG. 2, various devices such as motors and power sources are connected, but are not the main object of the present invention herein, and therefore, will be omitted from illustration and description.

Figure 2:
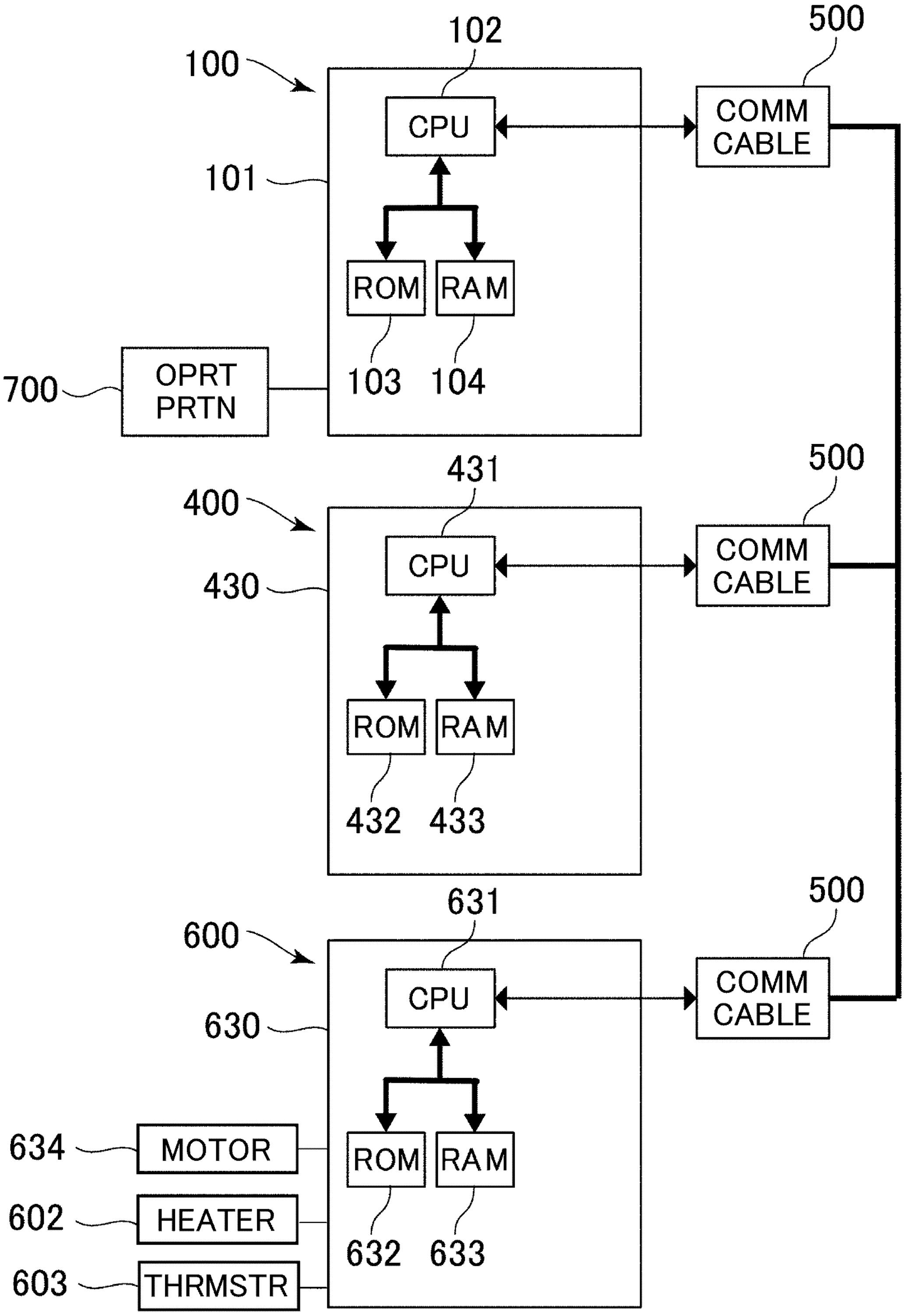
FIG. 2 is a control block diagram showing a control constitution of the image forming system.

In the image forming system 1X of this embodiment, as shown in FIG. 2, to the main controller 101, the folding processing controller 430 and the pressure-bonding processing controller 630 are connected via communication cables 500 so as to be capable of communicating operation instructions and various data. In accordance with the operation instructions from the main controller 101, the folding processing controller 430 causes the folding processing apparatus 400 to operate, and the pressure-bonding processing controller 630 causes the pressure-bonding apparatus 600 to operate. That is, while the main controller 101 controls the operation of the image forming apparatus 100, the main controller 101 is capable of controlling entirety of the image forming system 1X by sending the operation instructions to the pressure-bonding processing apparatus 200 (the folding processing apparatus 400 and the pressure-bonding apparatus 600).

The main controller 101, the folding processing controller 430, and the pressure-bonding processing controller 630 which are described above may have the same constitution. For example, each of the controllers includes a CPU (central processing unit), a ROM (read only memory), and a RAM (random access memory).

The main controller 101 includes the CPU 102, the ROM 103, and the RAM 104. In the ROM 103 and the RAM 104, various programs and various data for "pressure-bonding printed matter preparation processing" (see FIG. 8) described later. Incidentally, the RAM 104 is capable of temporarily storing a calculation (computation) processing result or the like with execution of the various programs.

The image forming apparatus 100 includes an operating portion 700 including, for example, a liquid crystal display portion 710 (see FIG. 1), and the operating portion 700 as an input portion is connected to the main controller 101. The operating portion 700 is capable of displaying, on a liquid crystal display portion 710, various screens presenting the various programs and various data or the like. Further, the operating portion 700 is a touch panel to which the user is capable of inputting information, and receives input of a start of the various programs and input of the various data depending on a user operation such as a touch operation by the user.

The user is capable of inputting a start of an image forming job from the operating portion 700. With this execution, together with the image forming apparatus 100, the pressure-bonding processing apparatus 200 (the folding processing apparatus 400 and the pressure-bonding apparatus 600) is capable of being operated. In this embodiment in the case where the image forming job is inputted, the CPU 102 executes the "pressure-bonding printed matter preparation processing" stored in the ROM 103.

The folding processing controller 430 includes a CPU 431, a ROM 432, and a RAM 433. The CPU 431 causes the folding processing apparatus 400 to operate on the basis of a control program stored in the ROM 432.

The pressure-bonding processing controller 630 includes a CPU 631, a ROM 632, and a RAM 633. The CPU 631 causes the pressure-bonding apparatus 600 to operate on the basis of a control program stored in the ROM 632. To the pressure-bonding processing controller 630, a motor 634 for rotationally driving the pressure-bonding roller pair 601, the heaters 602 for heating the pressure-bonding roller pair 601, and the thermistors 603 for detecting the temperatures of the pressure-bonding roller pair 601 are connected. The pressure-bonding processing controller 630 sends a detection result (temperature data) of the thermistors 603 to the main controller 101. Further, the pressure-bonding processing controller 630 is capable of changing the temperatures of the heaters 602 by receiving a target temperature from the main controller 101. Further, the pressure-bonding processing controller 630 is capable of changing the number of rotations of the motor 634 by receiving a target speed of the feeding recording material S from the main controller 101. Further, the pressure-bonding processing controller 630 is capable of changing the pressure of the pressure-bonding roller pair 601 in accordance with control of the main controller 101.

<Recording Material>

Next, the recording material S will be described. In this embodiment, as the recording material S, the recording material S of the pre-paste type including a base material and an adhesive layer. As the base material, a base material capable of forming the adhesive layer on at least one surface (side) thereof may only be required, and it is possible to cite high-quality paper, medium-quality paper, coated paper, and the like, for example. Further, from a viewpoint of confidentiality of information, it is desirable that the base material does not permit light transmission and thus the toner image formed on one side is not readily seen through the recording material S on the other side.

The adhesive layer is formed by applying the pressure-bonding paste on the recording material S, and the pressure-bonding paste contains an adhesive base material and an adhesive force adjusting agent. As the adhesive base material, a composition in which, for example, natural rubber latex or a modified product thereof, synthetic rubber wax, synthetic resin, and the like are compounded is used, and the composition exhibits an adhesive force as a pressure-sensitive adhesive which is pseudo-bonded by pressure application. The adhesive force adjusting agent is a well-known wax such as paraffin wax, or a fine-particle filler formed of silica, titanium oxide, calcium carbonate, or the like. Either one of these materials is low in affinity for the adhesive base material and is used for adjusting the adhesive force of the adhesive base material.

The filler contained in the adhesive base material projects from the adhesive base material, so that an uneven shape is formed on a surface of the adhesive layer. By this uneven shape, the adhesive base material is not exposed to the surface of the adhesive during non-pressure application, and therefore, the adhesive does not exhibit the adhesive force. On the other hand, when surfaces on which the adhesive layer is applied are superposed on and pressed by each other, the adhesive base material positioned under the uneven portion is exposed to the surface of the adhesive, and therefore, contacts the adhesive base material or the adhesive force adjusting agent on the opposite surface, so that the adhesive exhibits the adhesive force. Incidentally, when a point such that the pressure-bonding postcard is more inexpensive in transportation cost such as postage than an envelope is taken into consideration, it is desirable that a basis weight of the recording material S of the pre-paste type is for example, “64 $g/m^2$ to 209 $g/m^2$”.

<Pressure-Bonding Postcard Sheet for Two-Folding>

As an example of the recording material S, a pressure-bonding postcard sheet for two-folding will be described using parts (a) and (b) of FIG. 3. Part (a) of FIG. 3 shows a first side (surface) of the pressure-bonding postcard sheet for the two-folding, and part (b) of FIG. 3 shows a second side (surface) of the pressure-bonding postcard sheet for the two-folding.

The pressure-bonding postcard sheet for the two-folding (recording material S) has a front/back constitution including a paste surface 810, shown in part (a) of FIG. 3, onto which the pressure-bonding paste is applied and a non-paste surface 820, shown in part (b) of FIG. 3, onto which the pressure-bonding paste is not applied. Specifically, a back surface of a first region 801 is a fourth region 804, and a back surface of a second region 802 is a third region 803. The pressure-bonding postcard sheet is subjected to the two-folding by valley folding at a position of a fold Sal between the first region 801 and the second region 802 on the paste surface 810, for example. In this case, there is a need than an image of secret information such as personal information is formed on the paste surface 810 (first region 801, second region 802) and that an image of a non-secret information such as an address is formed on the non-paste surface 820 (third region 803, fourth region 804).

In the image forming apparatus 100, the pressure-bonding postcard sheet is supplied from the cassette 10 or the manual feeding tray 160 (see FIG. 1). Then, the image is formed on the paste surface 810, and thereafter, the pressure-bonding postcard sheet is discharged from the image forming apparatus 100 to the pressure-bonding processing apparatus 200. In the case of this embodiment, there is a need that in order to perform valley folding such that the paste surface 810 of the recording material S is disposed inside in the folding processing apparatus 400, the user sets the pressure-bonding postcard sheet at the cassette 10 or the manual feeding tray 160 in a set mode such that the recording material S is discharged from the image forming apparatus 100 in a state in which the paste surface 810 is facing upward.

In the case of this embodiment, when the paste surface 810 is set upward in the cassette 10 during an operation of a double-side image forming mode, the recording material S is discharged in the state in which the paste surface 810 is facing upward, and then is subjected to the valley folding with the paste surface 810 inward in the folding processing apparatus 400. Or, in the case where the paste surface 810 is set downward in the cassette 10 during the operation in the single-side image forming mode, the recording material S is discharged in the state in which the paste surface 810 is facing upward, and then is subjected to the valley folding with the paste surface 810 inward in the folding processing apparatus 400.

FIG. 4 is a schematic sectional view of an example of a direction of the pressure-bonding postcard sheet during the two-folding. In FIG. 4, the recording material S is set in the cassette 10 in a state in which the paste surface 810 (first region 801, second region 802) is facing upward, and an operation in the image forming mode is executed. Further, in the example shown here, the folded pressure-bonding postcard sheet is discharged from the folding processing apparatus 400 to the pressure-bonding apparatus 600 with the fold Sal on a leading end side.

Further, in the case where the recording material S is set on the manual feeding tray 160 in a state in which the paste surface 810 is facing downward during the operation in the double-side image forming mode, the recording material S is discharged from the image forming apparatus 100 in a state in which the paste surface 810 is facing upward, and then is subjected to valley folding in a state in which the paste surface 810 is disposed inside in the folding processing apparatus 400. Or, in the case where the recording material S is set on the manual feeding tray 160 in a state in which the paste surface 810 is facing upward during an operation in the one-side image forming mode, the recording material S is discharged from the image forming apparatus 100 in the state in which the paste surface 810 is facing upward, and then is subjected to the valley folding in a state in which the paste surface 810 is disposed inside in the folding processing apparatus 400.

Thus, in order to prepare an appropriate pressure-bonding postcard, the user needs to change the set mode of the pressure-bonding postcard sheet depending on whether a set position (place) is the cassette 10 or the manual feeding tray 160. However, as regards the folding processing apparatus 400, although illustration is omitted, there is also a specification such that the pressure-bonding postcard sheet is subjected to two-folding processing by mountain folding. In that case, the pressure-bonding postcard sheet is discharged from the image forming apparatus 100 in the state in which the paste surface 810 is facing downward, so that the pressure-bonding postcard sheet is subjected to the mountain folding in a state in which the paste surface 810 is disposed inside in the folding processing apparatus 400.

<Set Mode>

Next, a proper set mode of the pressure-bonding postcard sheet for the two-folding will be described. FIG. 5 shows combinations of set modes of pressure-bonding postcard sheets for two-folding depending on a specification of the image forming apparatus 100 and a specification of the folding processing apparatus 400. In FIG. 5, a “FOLDING DIRECTION” of the folding processing apparatus 400 shows that the pressure-bonding postcard sheet is folded in the folding processing apparatus 400 by which one of the valley folding and the mountain folding and that the pressure-bonding postcard sheet is fed in the state in which the paste surface 810 is facing upward during the valley folding and is fed in a state in which the non-paste surface 820 is facing upward during the mountain folding. A “FEEDING DIRECTION (FOLD POSITION)” of the folding processing apparatus 400 shows that when the pressure-bonding postcard sheet is fed from the folding processing apparatus 400 to the pressure-bonding apparatus 600, the fold Sal is positioned on a leading end (front) or a trailing end side (rear) with respect to the feeding direction.

Further, a “DISCH (discharge) DIRECTION” is shown by “FACE UP” in a state in which the surface of the recording material S set in the set position of the image forming apparatus 100 is facing upward, i.e., in the case where the recording material S is discharged from the image forming apparatus 100 without being reversed, and is shown by “FACE DOWN” in a state in which the surface of the recording material S set in the set position is facing downward, i.e., in the case where the recording material S is reversed and discharged from the image forming apparatus 100. A “SET DIRECTION” of the image forming apparatus 100 is a proper set mode of the pressure-bonding postcard sheet in a set position (for example, the cassette 10 or the manual feeding tray 160) where the “DISCH DIRECTION”

of the image forming apparatus 100 is "FACE UP" or "FACE DOWN" during an operation in any image forming mode.

"E1" shows that the pressure-bonding postcard sheet is set as "SET DIRECTION is paste surface (PS): UP" in the case where "FOLDING DIRECTION is VF (valley-folding)" and "FEEDING DIRECTION is FDLE (feeding direction leading end)" side as the specification of the folding processing apparatus 400 and "DISCH DIRECTION is FACE UP" as the specification of the image forming apparatus 100. "E2" shows that the pressure-bonding postcard sheet is set as "SET DIRECTION is PS: DOWN" in the case where "FOLDING DIRECTION is VF" and "FEEDING DIRECTION is FDTE (feeding direction trailing end)" side as the specification of the folding processing apparatus 400 and "DISCH DIRECTION is FACE DOWN" as the image forming apparatus 100. "E3" shows that the pressure-bonding postcard sheet is set as "SET DIRECTION is paste surface: DOWN" in the case where "FOLDING DIRECTION is MF (mountain-folding)" and "FEEDING DIRECTION is FDLE (feeding direction leading end)" side as the specification of the folding processing apparatus 400 and "DISCH DIRECTION is FACE UP" as the specification of the image forming apparatus 100. "E4" shows that the pressure-bonding postcard sheet is set as "SET DIRECTION is PS: UP" in the case where "FOLDING DIRECTION is MF" and "FEEDING DIRECTION is FDTE (feeding direction trailing end)" side as the specification of the folding processing apparatus 400 and "DISCH DIRECTION is FACE DOWN" as the image forming apparatus 100.

As described above, depending on the specification of the image forming apparatus 100 and the specification of the folding processing apparatus 400, the set mode of the pressure-bonding postcard sheet for the two-folding in the image forming apparatus 100 is determined. Here, as regards the two-folding, a preparation of the pressure-bonding postcard in the case where the set mode of the pressure-bonding postcard sheet is incorrect is shown in FIG. 6.

As shown in FIG. 6, for example, when the pressure-bonding postcard sheet is not set in the cassette 10 as in the set mode (E1) shown in FIG. 5, the pressure-bonding postcard is not properly prepared. That is, when the pressure-bonding postcard sheet is set in the cassette 10 in the state in which the non-paste surface 820 (third region 803, fourth region 804) is facing upward, a state in which the paste surface 810 is facing downward is formed when the pressure-bonding postcard sheet is discharged from the image forming apparatus 100, so that the pressure-bonding postcard sheet is discharged toward the folding processing apparatus 400. Then, in the folding processing apparatus 400, the pressure-bonding postcard sheet is valley-folded with the paste surface 810 outward. For that reason, the paste surface 810 onto which the pressure-bonding paste is applied is exposed to the front (surface) side, so that the pressure-bonding postcard sheet is not pressure-bonded even when is subjected to pressure-bonding by the pressure-bonding processing apparatus 200, and thus the pressure-bonding postcard is not properly prepared.

<Pressure-Bonding Postcard Sheet for Outward Three-Folding>

Next, a pressure-bonding postcard sheet for outward three-folding will be described using parts (a) and (b) of FIG. 7. Part (a) of FIG. 7 shows a first side 830 of the pressure-bonding postcard sheet for the outward three-folding, and part (b) of FIG. 7 shows a second side 840 of the pressure-bonding postcard sheet for the outward three-folding. As regards the pressure-bonding postcard sheet for the outward three-folding, the pressure-bonding paste is applied onto a second region 902 and a third region 903 of the first side 830 and a fourth region 904 and a fifth region 905 of the second side 840, and is not applied onto a first region 901 of the first side 830 and a sixth region 906 of the second side 840.

A front/back relationship of the pressure-bonding postcard sheet for the outward three-folding is such that the back side of the first region 901 is the fourth region 904, the back side of the second region 902 is the fifth region 905, and the back side of the third region 903 is the sixth region 906. On the pressure-bonding postcard sheet for the outward three-folding, a first paste surface is formed by applying the pressure-bonding paste so as to extend over the second region 902 and the third region 903, and a second paste surface is formed by applying the pressure-bonding paste so as to extend over the fourth region 904 and the fifth region 905. Accordingly, there is a need that an image of secret information such as personal information is formed on the first paste surface (902, 903) and the second paste surface (904, 905) and that an image of non-secret information such as an address is formed on the non-paste surface 820 (first region 901, sixth region 906).

FIG. 8 is a schematic view showing an example of a direction of the pressure-bonding postcard sheet during the outward three-folding. In FIG. 8, the case where the second side 840 (904, 905) is set in the cassette 10 so as to face upward and the operation in the double-side image forming mode is executed is shown. The pressure-bonding postcard sheet for the outward three-folding is subjected to the outward three-folding by being valley-folded at a position of a fold Sb2 between the fourth region 904 and the fifth region 905 and by being mountain-folded at a position of a fold Sb1 between the fifth region 905 and the sixth region 906. That is, on the first side 830, the back side of the fold Sb2 is the mountain folding, and the back side of the fold Sb1 is the valley folding. Then, the folded pressure-bonding postcard sheet is discharged from the folding processing apparatus 400 toward the pressure-bonding apparatus 600 in a state in which the sixth region 906 which is the non-paste surface of the second side 840 is facing upward (front surface) and in which the fold Sb1 is positioned on the leading end side with respect to the feeding direction.

<Set Mode>

Next, a proper set mode of the pressure-bonding postcard sheet for the outward three-folding will be described. In FIG. 9, combinations of the set modes of the pressure-bonding postcard sheet for the outward three-folding depending on the specification of the image forming apparatus 100 and the specification of the folding processing apparatus 400 are shown.

In FIG. 9, "FOLDING DIRECTION" shows whether the pressure-bonding postcard sheet is folded by which one of Z-folding (ZF) and reverse Z-folding (REF) in the folding processing apparatus 400 and whether the pressure-bonding postcard sheet is fed in a state in which the first paste surface (902, 903) or the second paste surface (904, 905) is positioned on which one of the leading end side and the trailing end side during the Z-folding or the reverse Z-folding. The "FEEDING DIRECTION (FOLD POSITION)" of the folding processing apparatus 400 shows whether the fold Sb1 is positioned on the leading end side (front side) or the trailing end side (rear side) with respect to the feeding direction when the pressure-bonding postcard sheet is discharged from the folding processing apparatus 400 toward the pressure-bonding apparatus 600.

The "DISCH (discharge) DIRECTION" is shown by "FACE UP" in a state in which the surface (first side 830 or second side 840) of the recording material S set in the set position of the image forming apparatus 100 is facing upward, i.e., in the case where the recording material S is discharged from the image forming apparatus 100 without being reversed, and is shown by "FACE DOWN" in a state in which the surface (first side 830 or second side 840) of the recording material S set in the set position is facing downward, i.e., in the case where the recording material S is reversed and discharged from the image forming apparatus 100.

A "SET DIRECTION" of the image forming apparatus 100 is a proper set mode of the pressure-bonding postcard sheet in a set position (for example, the cassette 10 or the manual feeding tray 160) where the "DISCH DIRECTION" of the image forming apparatus 100 is "FACE UP" or "FACE DOWN" and where the "FOLDING DIRECTION" of the folding processing apparatus 400 is "FDLE" or "FDTE". In the image forming system 1X shown in FIG. 1, for example, even in either one of the operation in the double-side image forming mode and the operation in the one-side image forming mode, FIG. 9 shows that when the pressure-bonding postcard for Z-folding is prepared, there is a need to set the pressure-bonding postcard sheet so that "SET DIRECTION" is "PSLE (paste surface: leading end)" in the case where the pressure-bonding postcard sheet is set in the cassette 10 and there is also a need to set the pressure-bonding postcard sheet so that "SET DIRECTION" is "PULSE" in the case where the pressure-bonding postcard sheet is set on the manual feeding tray 160. FIG. 9 shows that when the pressure-bonding postcard for reverse Z-folding is prepared, there is a need to set the pressure-bonding postcard sheet so that "SET DIRECTION" is "PSTE (paste surface: this embodiment) in order to set the pressure-bonding postcard sheet in the cassette 10 or on the manual feeding tray 160.

"F1" shows that the pressure-bonding postcard sheet is set as "SET DIRECTION is PSLE" in the case where "FOLDING DIRECTION is ZD (Z-folding)" and "FEEDING DIRECTION is FDTE" side as the specification of the folding processing apparatus 400 and "DISCH DIRECTION is FACE UP" as the specification of the image forming apparatus 100. "F2" shows that the pressure-bonding postcard sheet is set as "SET DIRECTION is PSLE" in the case where "FOLDING DIRECTION is ZF" and "FEEDING DIRECTION is FDTE" side as the specification of the folding processing apparatus 400 and "DISCH DIRECTION is FACE DOWN" as the image forming apparatus 100. "F3" shows that the pressure-bonding postcard sheet is set as "SET DIRECTION is PSTE" in the case where "FOLDING DIRECTION is RZF (reverse Z-folding)" and "FEEDING DIRECTION is FDLE" side as the specification of the folding processing apparatus 400 and "DISCH DIRECTION is FACE UP" as the specification of the image forming apparatus 100. "F4" shows that the pressure-bonding postcard sheet is set as "SET DIRECTION is PSTE" in the case where "FOLDING DIRECTION is RZF" and "FEEDING DIRECTION is FDLE" side as the specification of the folding processing apparatus 400 and "DISCH DIRECTION is FACE DOWN" as the image forming apparatus 100.

As described above, depending on the specification of the image forming apparatus 100 and the specification of the folding processing apparatus 400, the set mode of the pressure-bonding postcard sheet for the outward three-folding in the image forming apparatus 100 is determined. Here, as regards the Z-folding, a preparation of the pressure-bonding postcard in the case where the set mode of the pressure-bonding postcard sheet is incorrect is shown in FIG. 10.

As shown in FIG. 10, for example, when the pressure-bonding postcard sheet is not set as in the set mode (F3, PSTE) shown in FIG. 9, the pressure-bonding postcard is not properly prepared in the case of the reverse Z-folding. That is, when the pressure-bonding postcard sheet is set in the cassette 10 in the set direction ("PSLE") which is the same as the folding direction shown in "F1" of FIG. 9, the pressure-bonding postcard sheet is discharged from the image forming apparatus 100 toward the folding processing apparatus 400 while keeping the set direction ("PSLE"). Then, in the folding processing apparatus 400, the pressure-bonding postcard sheet is valley-folded at the fold Sb1 and is mountain-folded at the fold Sb2 (reverse Z-folding). For that reason, the fourth region 904 onto which the pressure-bonding paste is applied is exposed to the front (surface) side, so that the pressure-bonding postcard sheet is not pressure-bonded even when is subjected to pressure-bonding by the pressure-bonding processing apparatus 200, and thus the pressure-bonding postcard is not properly prepared.

As described above, in the case where the user made a mistake in set mode of the pressure-bonding postcard sheet, when the pressure-bonding postcard is not properly prepared, the pressure-bonding postcard sheet becomes useless. Therefore, conventionally, the user checks whether or not the user makes the mistake in set mode of the pressure-bonding postcard sheet, by taking the trouble to make trial printing, so that it took time and effort and was troublesome.

<Pressure-Bonding Printed Matter Preparation Processing>

Therefore, in this embodiment, the user was caused to be capable of setting the pressure-bonding postcard sheet in the cassette 10 or on the manual feeding tray 160 without making the mistake in set mode of the pressure-bonding postcard sheet even when the user does not actually prepare the pressure-bonding printed matter.

"Pressure-bonding printed matter preparation processing" in this embodiment for realizing the setting of the pressure-bonding postcard sheet will be described using FIGS. 11 to 14 while making reference to FIGS. 1 and 2. The "pressure-bonding printed matter preparation processing" in this embodiment is started by the main controller 101 with the input or a start of the "image forming job" and is ended with an end of the "image forming job".

As shown in FIG. 11, the main controller 101 discriminates whether or not the "image forming job" inputted from the operating portion 700 is a job for preparing the pressure-bonding printed matter (S1). Whether or not the job is the job for preparing the pressure-bonding printed matter is discriminated on the basis of a kind of the recording material S inputted from the operating portion 700.

For example, when the inputted kind of the recording material S is "pressure-bonding postcard", the job is discriminated as the job for preparing the pressure-bonding printed matter. Incidentally, from the operating portion 700, whether to prepare the pressure-bonding printed matter in the operation in the double-side image forming mode or in the operation in the one-side image forming mode may be inputted. Or, in the case where the pressure-bonding printed matter is prepared, the operation in the double-side image forming mode may be automatically executed.

In the case where the job is not the job for preparing the pressure-bonding printed matter (NO of S1), the main controller 101 controls the image forming apparatus 100, so that the image is formed on the recording material S (S2). In this case, the main controller 101 does not send an operation instruction for the pressure-bonding processing apparatus 200 to the folding processing controller 430 and the pressure-bonding processing controller 630 while controlling the operation of the image forming apparatus 100. Therefore, although the image is formed on the recording material S, the pressure-bonding processing of the recording material S is not carried out, so that the recording material S on which the image is formed is only prepared, and the pressure-bonding printed matter is not prepared. Incidentally, in the case where the job is not the job for preparing the pressure-bonding printed matter, the set position is inputted from the operating portion 700 by the user, and the recording material S is supplied from the inputted set position (the cassette 10 or the manual feeding tray 160).

In the case where the job is the job for preparing the pressure-bonding printed matter (YES of S1), the main controller 101 executes an operation in a preparation mode for preparing the pressure-bonding printed matter. First, the main controller 101 receives input of the kind of the recording material S (for example, the pressure-bonding postcard sheet for the two-folding or the outward three-folding), the set position of the recording material S, and the set mode of the recording material S (S3). The set position of the recording material S is, for example, the cassette 10, the manual feeding tray 160, and the like, and is inputted from the operating portion 700 by the user. Further, in the case of this embodiment, the set mode of the recording material S is inputted by the user from a "setting screen" (see FIG. 12 described later) displayed at the liquid crystal display portion 710.

Then, the main controller 101 discriminates whether or not the image forming apparatus 100 and the pressure-bonding processing apparatus 200 are communicatably connected to each other (S4). In the case where the image forming apparatus 100 and the pressure-bonding processing apparatus 200 are communicatably connected to each other (YES of S4), the main controller 101 acquires the specification of the folding processing apparatus 400 from the pressure-bonding processing apparatus 200 (S5). On the other hand, in the case where the image forming apparatus 100 and the pressure-bonding processing apparatus 200 are not communicatably connected to each other (NO of S4), the main controller 101 receives input of the specification of the folding processing apparatus 400 (S6). The specification of the folding processing apparatus 400 is inputted by the user from, for example, the "setting screen" (see FIG. 12) displayed at the liquid crystal display portion 710. The specification of the folding processing apparatus 400 mentioned herein is the "FEEDING DIRECTION" and the "FOLDING DIRECTION" shown in FIGS. 5 and 9. The specification of the image forming apparatus 100 is the "DISCH DIRECTION" of the image forming apparatus 100.

An example of the "setting screen" is shown in FIG. 12. In FIG. 12, the case where the pressure-bonding postcard sheet for the two-folding is selected as the kind of the recording material S is shown as an example. Therefore, as shown in FIG. 12, display is made in the "setting screen" so that the user can understand that "KIND OF FOLDING" is "TWO FOLD" (two-folding).

In the case where the main controller 101 receives the input of the specification of the folding processing apparatus 400, in the "setting screen", a "FEEDING DIRECTION" and a "FOLDING DIRECTION" of the folding processing apparatus 400 are displayed in a selectable input manner. In the case of "TWO FOLD", the user is capable of selecting either one of "FDLE" (feeding direction: leading end) and "FDTE" (feeding direction: this embodiment) as the "FEEDING DIRECTION", and is capable of selecting either one of "FDVF" (feeding direction valley folding) and "FDMF" (feeding direction mountain folding) as the "FOLDING DIRECTION"). Selection items of the "FEEDING DIRECTION" and the "FOLDING DIRECTION" for the folding processing apparatus 400 are in accordance with the specification of the folding processing apparatus 400 (see FIGS. 5 and 9). For that reason, in the case where the pressure-bonding postcard sheet for "THREE FOLD" (outward three-folding) is selected as the kind of the recording material S, the selection items of the "FEEDING DIRECTION" are "FDLE" and "FDTE", and the selection items of the "FOLDING DIRECTION" are "FDZF" and "FDRZF".

Further, display is made in the "setting screen" that the user can understand the "DISCH DIRECTION". In the case of this embodiment, the "DISCH DIRECTION" of the image forming apparatus 100 is determined by the set position of the recording material S inputted from the operating portion 700 and the operation in the double-side or one-side image forming mode. For example, in the case where the set position of the recording material S is the "manual feeding tray 160" and the image forming mode is the double-side image forming mode, the discharging direction ("DISCH DIRECTION") is determined as "FACE DOWN". In the case where the set position of the recording material S is the "manual feeding tray 160" and the image forming mode is the one-side image forming mode, the discharging direction is determined as "FACE UP".

In the case where the set position of the recording material S is the "cassette 10" and the image forming mode is the double-side image forming mode, the discharging direction is determined as "FACE UP". In the case where the set position of the recording material S is the "cassette 10" and the image forming mode is the one-side image forming mode, the discharging direction is determined as "FACE DOWN".

Further, in the "setting screen", a "SHEET SET DIRECTION" of the image forming apparatus 100 is displayed in a selectable manner. In the case of the "TWO FOLD", the user is capable of selectively inputting either one of "PS: UP" and "PS:DOWN" showing the front/back direction of the paste surface as the "SHEET SET DIRECTION". The selection items of the "SHEET SET DIRECTION" of the image forming apparatus 100 are in accordance with the specification of the image forming apparatus 100 (see FIGS. 5 and 9). For that reason, in the case where the pressure-bonding postcard sheet for the outward three-folding ("THREE FOLD") is selected as the kind of the recording material S, the selection items of the "SHEET SET DIRECTION" are "PSTE" and "PSLE".

Returning to description of FIG. 11, the main controller 101 prepares a completion image of the pressure-bonding printed matter on the basis of the set position of the recording material S and the set mode of the recording material S (the specification of the image forming apparatus 100) which are inputted by the user, and the specification of the folding processing apparatus 400) (S7). Then, the main controller 101 checks the table data (see FIGS. 5 and 9) on the basis of the inputted set mode (set direction) of the recording material S (S8), and then discriminates whether or not the pressure-bonding printed matter is properly prepared (S9). In the case where a combination of the selected "SET DIRECTION" and the "DISCH DIRECTION" (FACE UP, FACE DOWN) determined depending on the inputted set position with the "FEEDING DIRECTION" and the "FOLDING DIRECTION" of the folding processing apparatus 400 is defined in table data for the two-folding and table data for the outward three-folding, the main controller 101 discriminates that the pressure-bonding printed matter is properly prepared. Incidentally, the table data for the two-folding and the table data for the outward three-folding are stored in the ROM 103 (see FIG. 2) in advance.

In the case where the main controller 101 discriminated that the pressure-bonding printed matter is properly prepared (YES of S9), the main controller 101 causes the liquid crystal display portion 710 to display a "normal set screen" (S10). In FIG. 13, an example of the "normal set screen" is shown. In FIG. 13, the case where the "FEEDING DIRECTION" of the folding processing apparatus 400 is the "FDLE", the "FOLDING DIRECTION" is the "FDVF", and the "SHEET SET DIRECTION" of the pressure-bonding postcard sheet for the two-folding in the cassette 10 is selected as "PS:UP" during the operation in the double-side image forming mode is shown as an example.

In this case, that table data (see FIG. 5) includes data corresponding to the above-described combination, and thus the pressure-bonding postcard can be properly prepared, so that the "normal set screen" is displayed.

As shown in FIG. 13, in the "normal set screen", a set image showing the set mode (set direction) of the recording material S inputted by the user is displayed. As the set image, in the case of the two-folding, front and back directions of the pressure-bonding postcard sheet for the two-folding set in the cassette 10 is displayed. Incidentally, in the case of the pressure-bonding postcard sheet for the outward three-folding, although illustration is omitted, the feeding direction of a bonding region (paste surface) of the pressure-bonding postcard sheet for the outward three-folding set in the cassette 10 is displayed.

Further, in the case of this embodiment, in the "normal set screen", the completion image of the pressure-bonding printed matter (see S7 of FIG. 11). Further, in the "normal set screen", as illustrated in the drawings, a discharge image showing the "DISCH DIRECTION" of the image forming apparatus 100 and a folding image showing the "FOLDING DIRECTION" of the folding processing apparatus 400 may be displayed. Incidentally, the completion image, the discharge image, and the folding image may be capable of being displayed by switching a screen from the screen of the set image. Further, although omitted here from illustration in the drawings, each of the completion image, the discharge image, and the folding image may also be displayed as an image including an image formed on the basis of image data.

Further, in the "normal set screen", together with the above-described images, a message to the effect that the pressure-bonding postcard can be properly prepared in the "SHEET SET DIRECTION" of the selected pressure-bonding postcard sheet. In an example shown in FIG. 14, by displaying "PRESSURE-BONDING PRINT CAN BE PROPERLY PREPARED. DO YOU PREPARE THE PRINT?", so that the message to the effect that the pressure-bonding postcard can be properly prepared in the "SHEET SET DIRECTION" of the selected pressure-bonding postcard sheet.

Incidentally, in the "normal set screen", a "RETURN" button and an "OK" button may be displayed. In the case where the "RETURN" button is operated by the user, when display of the liquid crystal display portion 710 is caused to return from a "set warning screen" to the above-described "setting screen" (see FIG. 12), the user can select the "SHEET SET DIRECTION" of the image forming apparatus 100 again from the "setting screen", thus being preferable. On the other hand, in the case where the "OK" button is operated by the user, through input of completion of setting of the recording material S in the set position by the user (see S11), preparation of the pressure-bonding printed matter is started.

Returning to FIG. 11, the main controller 101 receives input of completion of setting of the recording material S in the set position (S11). The input of the setting completion of the recording material S in the set position is made from, for example, the operating portion 700 by the user. When the main controller 101 receives the input of the setting completion of the recording material S in the set position, the main controller 101 controls the image forming apparatus 100 and the pressure-bonding processing apparatus 200, so that the image is formed on the recording material S (S12). That is, the main controller 101 sends the operation instruction for the pressure-bonding processing apparatus 200 to the folding processing controller 430 and the pressure-bonding processing controller 630 while controlling the operation of the image forming apparatus 100. By this, a series of processes from the image formation of the image on the recording material S to the pressure-bonding of the recording material S are performed by the image forming apparatus 100 and the pressure-bonding processing apparatus 200, so that the pressure-bonding printed matter is prepared.

On the other hand, in the case where the main controller 101 discriminated that the pressure-bonding printed matter is not properly prepared (NO of S9), the main controller 101 causes the liquid crystal display portion 710 to display the "set warning screen" described later (S13). In this case, the main controller 101 does not control the image forming apparatus 100 and the pressure-bonding processing apparatus 200, and thus formation of the image on the recording material S by the image forming apparatus 100 and pressure-bonding processing by the pressure-bonding processing apparatus 200 are not carried out, so that the pressure-bonding printed matter is not prepared.

FIG. 14 shows an example of the "set warning screen". In FIG. 14, the case where the "FEEDING DIRECTION" of the folding processing apparatus 400 is the "FDLE", the "FOLDING DIRECTION" is the "FDVF", and the "SHEET SET DIRECTION" of the pressure-bonding postcard for the two-folding in the cassette 10 is selected as the "PS:DOWN" during the operation in the double-side image forming mode is shown as an example. In this case, the table data for the two-folding (see FIG. 5) does not include data corresponding to the above-described combination, and thus the pressure-bonding postcard is not capable of being properly prepared, so that the "set warning screen" is displayed.

As shown in FIG. 14, in the "set warning screen", a set image showing the set mode (set direction) of the pressure-bonding postcard sheet in the set position is displayed. Further, in the case of this embodiment, in the "set warning screen", the completion image (see S7 of FIG. 11) of the pressure-bonding printed matter is displayed. Further, in the "set warning screen", as illustrated, the discharge image showing the "DISCH DIRECTION" of the image forming apparatus 100 and the folding image showing the "FOLDING DIRECTION" of the folding processing apparatus 400 may be displayed. Incidentally, although omitted from illustration, the completion image, the discharge image, and the folding image may be displayed as images each including an image formed on the basis of associated image data.

Further, in the "set warning screen", together with these images, "warning display" to the effect that the pressure-bonding postcard is not properly prepared in the "SHEET SET DIRECTION" of the selected pressure-bonding postcard is displayed. In the example shown in FIG. 14, the "warning display" such that "WARNING: PRESSURE- BONDING PRINT CANNOT BE PROPERLY PREPARED" is displayed. Incidentally, in the "set warning screen", the "RETURN" button may be displayed. In the case where the "RETURN" button is operated by the user, when display of the liquid crystal display portion 710 is caused to be returned from the "set warning screen" to the above-described "setting screen" (see FIG. 12), the user can select the "SHEET SET DIRECTION" of the image forming apparatus 100 again from the "setting screen", and thus is preferable.

As described above, in this embodiment, in the case where a constitution in which subsequently to the image formation, the pressure-bonding printed matter is prepared by pressure-bonding the recording material S is employed, during execution of the operation in a preparation mode for preparing the pressure-bonding printed matter, depending on the set position and the set mode in the image forming apparatus 100 inputted by the user, the main controller 101 causes the liquid crystal display portion 710 of the operating portion 700 to display whether or not the pressure-bonding printed matter can be prepared. By this, the user does not readily set the set mode S of the recording material S erroneously, so that there is no preparation of improper pressure-bonding printed matter such that the paste surface thereof is exposed to the surface thereof. Accordingly, the user needs not check whether or not the user erroneously sets the set mode of the recording material S, by taking the trouble to make trail printing as in the conventional manner, so that the user can efficiently prepare the pressure-bonding printed matter without trouble.

Incidentally, in the above-described embodiment, the image forming system 1X in which the pressure-bonding processing apparatus 200 is connected as a different casing to the apparatus main assembly of the image forming apparatus 100 was described as an example, but the pressure-bonding processing apparatus 200 may be provided inside the apparatus main assembly (inside the same casing) of the image forming apparatus 100. In that case, the main controller 101 also operates as the folding processing controller 430 and the pressure-bonding processing controller 630, which are described above.

According to the present invention, the user can set the recording material in the first set portion and the second set portion by checking the set mode of the recording material without preparing the pressure-bonding printed matter in actuality.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-196470 filed on Dec. 8, 2022, which is hereby incorporated by reference herein in its entirety.

What is claimed is:

1. An image forming system comprising:

an image forming apparatus including a stacking portion capable of stacking a recording material having an adhesive region in which an adhesive is applied onto a surface of the recording material, an image forming unit for forming an image on the recording material, and a fixing portion for fixing the image formed on the recording material;

a pressure-bonding processing apparatus including a folding processing portion for folding the recording material fed from the image forming apparatus, and a pressure-bonding portion capable of pressure-bonding the recording material folded by the folding processing portion under pressure application;

an inputting portion capable of inputting directions of a front surface and a back surface of the recording material stacked on the stacking portion; and a displaying portion for displaying a message indicating that a pressure-bonding printed matter is not properly prepared in a case that the directions of the front surface and the back surface of the recording material inputted by the inputting portion are different from directions of the front surface and the back surface of the recording material in which the pressure-bonding printed matter is capable of being properly prepared.

2. An image forming system according to claim 1, wherein the display portion displays the inputted directions of the front surface and the back surface of the recording material in the case that the directions of the front surface and the back surface of the recording material inputted by the inputting portion are different from the directions of the front surface and the back surface of the recording material in which the pressure-bonding printed matter is capable of being properly prepared.

3. An image forming system according to claim 1, wherein the display portion displays the pressure-bonding printed matter, on which the image is to be formed, depending on a result inputted by the inputting portion.

4. An image forming system according to claim 1, wherein depending on a result inputted by the inputting portion, the display portion displays the directions of the front surface and the back surface of the recording material fed from the image forming apparatus to the folding processing portion.

5. An image forming system according to claim 1, wherein the display portion displays a folding direction of the folding processing portion.

6. An image forming system according to claim 1, wherein the display portion displays a message indicating that a pressure-bonding printed matter is properly prepared in the case that the directions of the front surface and the back surface of the recording material inputted by the inputting portion are the directions of the front surface and the back surface of the recording material in which the pressure-bonding printed matter is capable of being properly prepared.

7. An image forming system according to claim 1, wherein the folding processing portion folds the recording material in two.

8. An image forming system according to claim 1, wherein the folding processing portion folds the recording material in three.

9. An image forming system comprising:

an image forming apparatus including a stacking portion capable of stacking a recording material having an adhesive region in which an adhesive is applied onto a surface of the recording material, an image forming unit for forming an image on the recording material, and a fixing portion for fixing the image formed on the recording material;

a pressure-bonding processing apparatus including a folding processing portion for folding the recording material fed from the image forming apparatus, and a pressure-bonding portion capable of pressure-bonding the recording material folded by the folding processing portion under pressure application;

an inputting portion capable of inputting directions of a front surface and a back surface of the recording material stacked on the stacking portion; and a displaying portion for displaying a message indicating that a pressure-bonding printed matter is properly prepared in a case that the directions of the front surface and the back surface of the recording material inputted by the inputting portion are directions of the front surface and the back surface of the recording material in which the pressure-bonding printed matter is capable of being properly prepared.

10. An image forming system according to claim 9, wherein the display portion displays the inputted directions of the front surface and the back surface of the recording material in the case that the directions of the front surface and the back surface of the recording material inputted by the inputting portion are the directions of the front surface and the back surface of the recording material in which the pressure-bonding printed matter is capable of being properly prepared.

11. An image forming system according to claim 9, wherein the display portion displays the pressure-bonding printed matter, on which the image is to be formed, depending on a result inputted by the inputting portion.

12. An image forming system according to claim 9, wherein depending on a result inputted by the inputting portion, the display portion displays the directions of the front surface and the back surface of the recording material fed from the image forming apparatus to the folding processing portion.

13. An image forming system according to claim 9, wherein the display portion displays a folding direction of the folding processing portion.

14. An image forming system according to claim 9, wherein the folding processing portion folds the recording material in two.

15. An image forming system according to claim 9, wherein the folding processing portion folds the recording material in three.

16. An image forming system comprising:

an image forming apparatus including a first stacking portion capable of stacking a recording material having an adhesive region in which an adhesive is applied onto a surface of the recording material, a second stacking portion capable of stacking the recording material having the adhesive region in which the adhesive is applied onto the surface of the recording material, an image forming unit for forming an image on the recording material, and a fixing portion for fixing the image formed on the recording material, wherein the recording material stacked on the first stacking portion is turned upside down from a stacked state and then is fed to the image forming unit, and the recording material stacked on the second stacking portion is fed to the image forming unit without being turned upside down;

a pressure-bonding processing apparatus including a folding processing portion for folding the recording material fed from the image forming apparatus, and a pressure-bonding portion capable of pressure-bonding the recording material folded by the folding processing portion under pressure application;

a controller capable of executing an operation in a preparation mode for preparing a pressure-bonding printed matter by folding and pressure-bonding the recording material, on which an image is formed, while controlling the image forming apparatus and the pressure-bonding processing apparatus;

an inputting portion capable of inputting directions of a front surface and a back surface of the recording material stacked on the first stacking portion, or capable of inputting the directions of a front surface and a back surface of the recording material stacked on the second stacking portion; and a displaying portion for displaying a message indicating that a pressure-bonding printed matter is not properly prepared in a case that the directions of the front surface and the back surface of the recording material inputted by the inputting portion are different from directions of the front surface and the back surface of the recording material in which the pressure-bonding printed matter is capable of being properly prepared.

17. An image forming system according to claim 16, wherein the display portion displays the inputted directions of the front surface and the back surface of the recording material in the case that the directions of the front surface and the back surface of the recording material inputted by the inputting portion are different from the directions of the front surface and the back surface of the recording material in which the pressure-bonding printed matter is capable of being properly prepared.

18. An image forming system according to claim 16, wherein the display portion displays a pressure-bonding printed matter, on which the image is to be formed, depending on a result inputted by the inputting portion.

19. An image forming system according to claim 16, wherein depending on a result inputted by the inputting portion, the display portion displays the directions of the front surface and the back surface of the recording material fed from the image forming apparatus to the folding processing portion.

20. An image forming system according to claim 16, wherein the display portion displays a folding direction of the folding processing portion.

21. An image forming system according to claim 16, wherein the display portion displays a message indicating that a pressure-bonding printed matter is properly prepared in the case that the directions of the front surface and the back surface of the recording material inputted by the inputting portion are the directions of the front surface and the back surface of the recording material in which the pressure-bonding printed matter is capable of being properly prepared.

22. An image forming system according to claim 16, wherein the folding processing portion folds the recording material in two.

23. An image forming system according to claim 16, wherein the folding processing portion folds the recording material in three.

* * * * *